(12) United States Patent
Doi

(10) Patent No.: US 8,407,781 B2
(45) Date of Patent: Mar. 26, 2013

(54) INFORMATION PROVIDING SUPPORT DEVICE AND INFORMATION PROVIDING SUPPORT METHOD

(75) Inventor: Shinichi Doi, Tokyo (JP)

(73) Assignee: NEC Corporation, Tokyo (JP)

( * ) Notice: Subject to any disclaimer, the term of this patent is extended or adjusted under 35 U.S.C. 154(b) by 436 days.

(21) Appl. No.: 12/671,688

(22) PCT Filed: Jul. 23, 2008

(86) PCT No.: PCT/JP2008/063612
§ 371 (c)(1),
(2), (4) Date: Feb. 1, 2010

(87) PCT Pub. No.: WO2009/017135
PCT Pub. Date: Feb. 5, 2009

(65) Prior Publication Data
US 2011/0023122 A1    Jan. 27, 2011

(30) Foreign Application Priority Data
Aug. 2, 2007    (JP) .................................. 2007-202095

(51) Int. Cl.
*G06F 7/04* (2006.01)
(52) U.S. Cl. ........... 726/17; 707/780; 707/781; 707/782
(58) Field of Classification Search .................... 726/25, 726/4, 17; 707/E17.014, 780, 769, 781, 782
See application file for complete search history.

(56) References Cited

U.S. PATENT DOCUMENTS
8,140,500 B2 * 3/2012 Workman et al. ............. 707/705
2004/0044905 A1   3/2004 Heath et al.
(Continued)

FOREIGN PATENT DOCUMENTS
CN   1495638 A   5/2004
EP   2 026 239 A1   2/2009
(Continued)

OTHER PUBLICATIONS

Kunio et al., "Knowledge Management: The Latest Developments of Knowledge Management", Joho Shori, Information Processing Society of Japan, vol. 47, No. 4, pp. 421-424 (Apr. 2006).

(Continued)

*Primary Examiner* — Beemnet Dada
(74) *Attorney, Agent, or Firm* — Dickstein Shapiro LLP

(57) ABSTRACT

It is an object to provide an information providing support device which is capable of encouraging a person having an intention or an obligation to provide information to provide safe and good quality information. An information providing support device of the present invention includes: an information storage unit for memorizing at least information input by a user of the information providing support device; an information providing request receiving unit for receiving the information providing request without intermediation of a user operation; an internal information retrieval unit for retrieving relevant information from the information storage unit in response to the information providing request received by the information providing request receiving unit, the relevant information being information relevant to the information providing request; and an information providing request presenting unit for presenting a predetermined information manager with the information providing request for which the relevant information has been retrieved by the internal information retrieval unit and the relevant information in association with each other, the information manager being authorized to permit the provision of the information stored in the information storage unit.

12 Claims, 14 Drawing Sheets

U.S. PATENT DOCUMENTS

| | | | |
|---|---|---|---|
| 2006/0020622 A1* | 1/2006 | Shelton | 707/102 |
| 2008/0256093 A1* | 10/2008 | Amitay et al. | 707/100 |
| 2009/0198735 A1* | 8/2009 | Yu et al. | 707/104.1 |

FOREIGN PATENT DOCUMENTS

| | | |
|---|---|---|
| JP | 10-207904 | 8/1998 |
| JP | 2001-014337 A | 1/2001 |
| JP | 2001-273310 A | 10/2001 |
| JP | 2002-055882 A | 2/2002 |
| JP | 2004-185341 A | 7/2004 |
| JP | 2006-134019 A | 5/2006 |
| JP | 2006-209649 A | 8/2006 |
| JP | 2006-268690 A | 10/2006 |
| JP | 2007-034965 A | 2/2007 |
| JP | 3909362 | 2/2007 |
| JP | 2008-129692 A | 6/2008 |
| WO | WO-2004/081750 A2 | 9/2004 |

OTHER PUBLICATIONS

Takahashi et al., "Methods for Estimating Syntactic Similarity", Information Processing Society of Japan, vol. 2002, No. 66, pp. 163-170 (Jul. 2002).

Suzuki et al., "Hierarchical Directed Acyclic Graph Kernel", IEICE Transactions on Information and Systems, Pt. 2, The Institute of Electronics, Information and Communication Engineers, vol. J88-D-2, No. 2, pp. 230-240 (Feb. 2005).

* cited by examiner

INFORMATION PROVIDING COMMISSION

WITH REGARD TO THE FOLLOWING INFORMATION PROVIDING REQUEST FROM ○○, THE FOLLOWING INFORMATION CREATED BY YOU IS HIT AS RELATED KNOWLEDGE DATA
THEREFORE, WE WOULD LIKE TO REQUEST YOUR COOPERATION IN PERMITTING THE PROVISION OR MAKING A REPLY INDIVIDUALLY

-----INFORMATION PROVIDING REQUEST CONTENTS-----

................................................
................................................
................................................
RELEVANT KEYWORDS:▲▲▲, ▲▲▲, ▲▲▲

INFORMATION PROVIDING REQUESTER:○○

――――――RELEVANT INFORMATION――――――

- ☐ 「aaa」(REGISTERED ON yy/mm/dd) [EDIT FOR PROVISION]
- ☐ 「bbb」(REGISTERED ON yy/mm/dd) [EDIT FOR PROVISION]

[PERMIT PROVISION OF SELECTED INFORMATION] [MAKE REPLY INDIVIDUALLY] [DISABLE PROVISION]

FIG. 12

INFORMATION PROVIDING SUPPORT DEVICE AND INFORMATION PROVIDING SUPPORT METHOD

TECHNICAL FIELD

This invention relates to an information providing support device and an information providing support method for supporting provision of information, and more particularly, to an information providing support device and an information providing support method for supporting provision of information according to an information providing request from an external portion.

BACKGROUND ART

At present, widely provided to organizations such as corporations is a knowledge management system having an object to improve achievements of an organization by allowing the whole organization to share and utilize its information and knowledge that are dispersed across individuals and departments. Such a knowledge management system is disclosed in, for example, MATSUI KUNIO, TANAKA HOZUMI, "Knowledge Management: The Latest Developments of Knowledge Management", Joho Shori, Information Processing Society of Japan, April 2006, Vol. 47, No. 4, p. 421-424 (Non-patent Document 1).

Further, in the world of the Internet, there exist sites dedicated to question/response, on which one person wishing to obtain information posts a question or a thing about which he/she wishes to know while another person makes a reply thereto (that is, information provision), and the sites are attracting a large number of participants.

For example, Japanese Unexamined Patent Application (JP-A) No. 2004-185341 (Patent Document 1) discloses an information provision service system including: reply candidate retrieval means for excerpting a keyword from a sentence of each question written to a question server and comparing relevances to matters regarding the past schedules of the respective users registered in schedule management means to thereby assign a highly-relevant user as a reply candidate with respect to the question; and contacting means for contacting the assigned user to make a request for a reply to the question.

Further, Japanese Unexamined Patent Application (JP-A) No. 2007-34965 (Patent Document 2) discloses a technology provided with a knowledge information database that indicates a relationship between an attribute of a knowledge worker and a document created by the knowledge worker, in which document creating means registers a document in the knowledge information database in association with the knowledge worker if the document is created by the knowledge worker, and in which knowledge exchanging means acquires information on the document and the knowledge worker from the knowledge information database and registers the document in a place for knowledge exchanges (including a mailing list, an electronic bulletin board, and a community site that exist on a network) which is accessible to a plurality of knowledge workers.

Further, Japanese Unexamined Patent Application (JP-A) No. 2001-273310 (Patent Document 3) discloses a various inquiry/reply service system provided with an automatic response unit for searching a response example database and a knowledgebase with regard to a question received through a Web page or electronic mail sent from a client or from inside a company via a communication line, and automatically returning a reply of a result thereof.

DISCLOSURE OF THE INVENTION

Problems to be Solved by the Invention

All the systems work by causing information and knowledge possessed by each individual and each department to be provided as knowledge to be managed in knowledge management or replies to posted questions. If information provision is not sufficiently performed, the system does not attract users (specifically, question posters, information providers, and persons who reference information). As a result, fewer persons to be information providers participate, and the information provision is performed less frequently, which falls into a vicious cycle. In contrast, with the information provision being performed actively, information distribution is invigorated as a whole, which allows a problem to be solved or produces a new idea. That is, a source of information dissemination attracts information, and the key to lead the system management to success is how to increase the amount of provided information having high quality.

However, attempts to promote the provision of information with respect to various information providing requests raise the following problems. First, there is a problem (first problem point) that it is difficult for the user to acknowledge the receipt of all the information providing requests, or even if the user may acknowledge the receipt of all of the information providing requests, the user may not notice the existence of information that the user is available to provide, thereby being not able to provide such information.

In general, one person can provide a wide variety of information. However, it is difficult for the one person to acknowledge the receipt all of the information providing requests. Therefore, there is proposed a method of previously registering field names of one's own specialty and relevant keywords to thereby inform him/her when a relevant information providing request is made. However, it is difficult to previously register all of the information that can be provided as the field names and the keywords. As a method for solving such difficulty of previously registering the information that can be provided as the field names and the keywords, the above-mentioned Patent Document 1 discloses a method of automatically extracting information from schedule information on users and of using the information as relevant fields for choosing a reply candidate. However, in the method disclosed in Patent Document 1 described above, only the schedule information is used, and hence, a portion that can be covered by the user as the field of the information that can be provided is small. Further, the choosing of the reply candidate is not enough to solve the problem that the user cannot provide the information that can be provided if the user does not notice its existence.

Further, for example, there is proposed a method of registering information held by each user automatically (in other words, forcibly) in the system to thereby utilize the information that can be provided as knowledge and reply information irrespective of whether or not the user is aware of the existence of such information (see, for example, the above-mentioned Patent Document 2). However, the method of registering the document created by the user automatically in the system to utilize the registered information raises another problem (second problem point) that information such as personal information or secret information that should not be provided to others or erroneous information may be provided unexpectedly. Note that a scheme of deleting the personal information by automatic discrimination thereof and a scheme of performing such a setting as to limit a range to be publicized are also proposed, but do not completely handle individual cases automatically. Suppose such a measure is taken as to cause the information provider to verify provision adequacy each time information is registered, such a problem (third problem point) arises that time and labor for the information provider increase.

Note that the reply service system disclosed in the above-mentioned Patent Document 3 is a system for automatically responding to the question sent to the system by retrieving necessary information from the response example database and the knowledgebase in which information regarding replies is accumulated in advance, and automatically replies to the question within such a scope as can be expected in advance by using existing resources. That is, an object thereof is to efficiently process the question sent to a corporation's Web site or other such question sent to a specific address, but is not to aim to invigorate the information distribution or share knowledge by actively providing the information having high quality with respect to various information providing requests.

For example, the above-mentioned Patent Document 3 includes a description that an operator makes a reply if a client is not satisfied with an answer or if an appropriate answer is not found, which poses the same problem with the other conventional systems in that there is a fear that the operator may not notice the existence of information relevant to the question. This is because, even if the existing resources including a knowledge database can be used, not only time and labor for a search are required, but also the existence of information that seems irrelevant according to a manual check but is actually relevant may be missed, or an appropriate search formula cannot be created with respect to information managed in a place unknown to himself/herself and may result in no search hit.

Accordingly, none of the systems described above is incapable of causing a person having an intention or an obligation to provide information to provide all of the information that can be provided, and cannot be considered as taking positive measures to attain the object to activate the information provision.

Therefore, an object of this invention is to provide an information providing support device and an information providing support method that can encourage a person having an intention or an obligation to provide information to provide safe and good quality information.

Specifically, an object of this invention is to provide an information providing support device and an information providing support method that allow an information provider to easily provide information that can be provided while ensuring security and quality of information provision.

Means to Solve the Problems

According to the present invention, there is provided an information providing support device for supporting provision of information according to an information providing request, including: an information storage unit for memorizing at least information input by a user of the information providing support device; an information providing request receiving unit for receiving the information providing request without intermediation of a user operation; an internal information retrieval unit for retrieving relevant information from the information storage unit in response to the information providing request received by the information providing request receiving unit, the relevant information being information relevant to the information providing request; and an information providing request presenting unit for presenting a predetermined information manager with the information providing request for which the relevant information has been retrieved by the internal information retrieval unit and the relevant information in association with each other, the information manager being authorized to permit the provision of the information stored in the information storage unit.

Further, according to the present invention, there is provided an information providing support method of supporting provision of information according to an information providing request, including: receiving the information providing request without intermediation of a user operation; retrieving information relevant to the received information providing request from an information storage unit provided to a device that has received the information providing request, the information storage unit memorizing at least information input by a user of the device; and presenting a predetermined information manager with the information providing request for which the relevant information has been retrieved from the information storage unit and the relevant information in association with each other, the information manager being authorized to permit the provision of the information stored in the information storage unit.

Further, according to the present invention, there is provided a computer-readable recording medium recorded with an information provision supporting program for supporting provision of information according to an information providing request, the information provision supporting program causing a computer to execute: a reception processing of receiving the information providing request without intermediation of a user operation; a retrieval processing of retrieving information relevant to the received information providing request from an information storage unit provided to a device that has received the information providing request for memorizing at least information input by a user of the computer; and a presentation processing of presenting a predetermined information manager with the information providing request for which the relevant information has been retrieved from the information storage unit and the relevant information in association with each other, the information manager being authorized to permit the provision of the information stored in the information storage unit.

According to this invention, with regard to the information providing request received by the information providing request receiving unit from an external portion without the intermediation of the user operation, the internal information retrieval unit retrieves the relevant information from the information storage unit, and then the information providing request presenting unit presents the information manager with the information providing request and the relevant information in association with each other, which enables easily providing information that can be provided by an information provider while ensuring security and quality of information provision by the information manager using the presented contents. Accordingly, it is possible to encourage a person having an intention or an obligation to provide information to provide safe and good quality information.

BRIEF DESCRIPTION OF THE DRAWINGS

FIG. 12 is an explanatory diagram illustrating an example of an information providing commission screen displayed by the information providing request presenting unit used for the information providing support device illustrated in FIG. 9.

BEST MODE FOR EMBODYING THE INVENTION

Hereinafter, description is made of embodiments of this invention with reference to the drawings.

First Exemplary Embodiment

Figure 1:
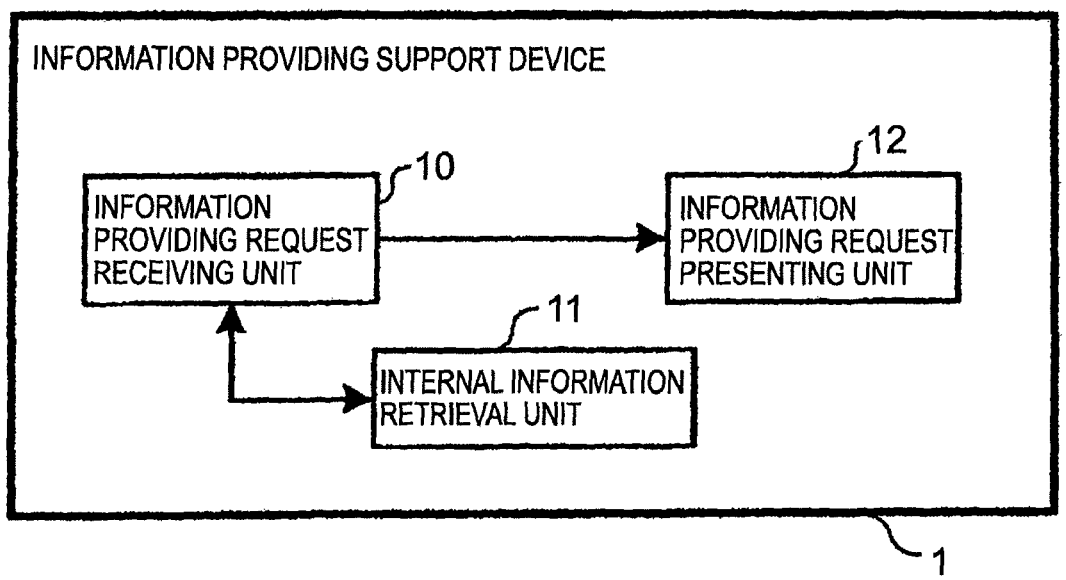
FIG. 1 is an explanatory diagram illustrating a configuration example of an information providing support device according to this invention.

FIG. 1 is an explanatory diagram illustrating a configuration example of an information providing support device 1 according to a first exemplary embodiment of this invention. The information providing support device 1 illustrated in FIG. 1 comprises an information providing request receiving unit 10, an internal information retrieval unit 11, and an information providing request presenting unit 12.

Figure 2:
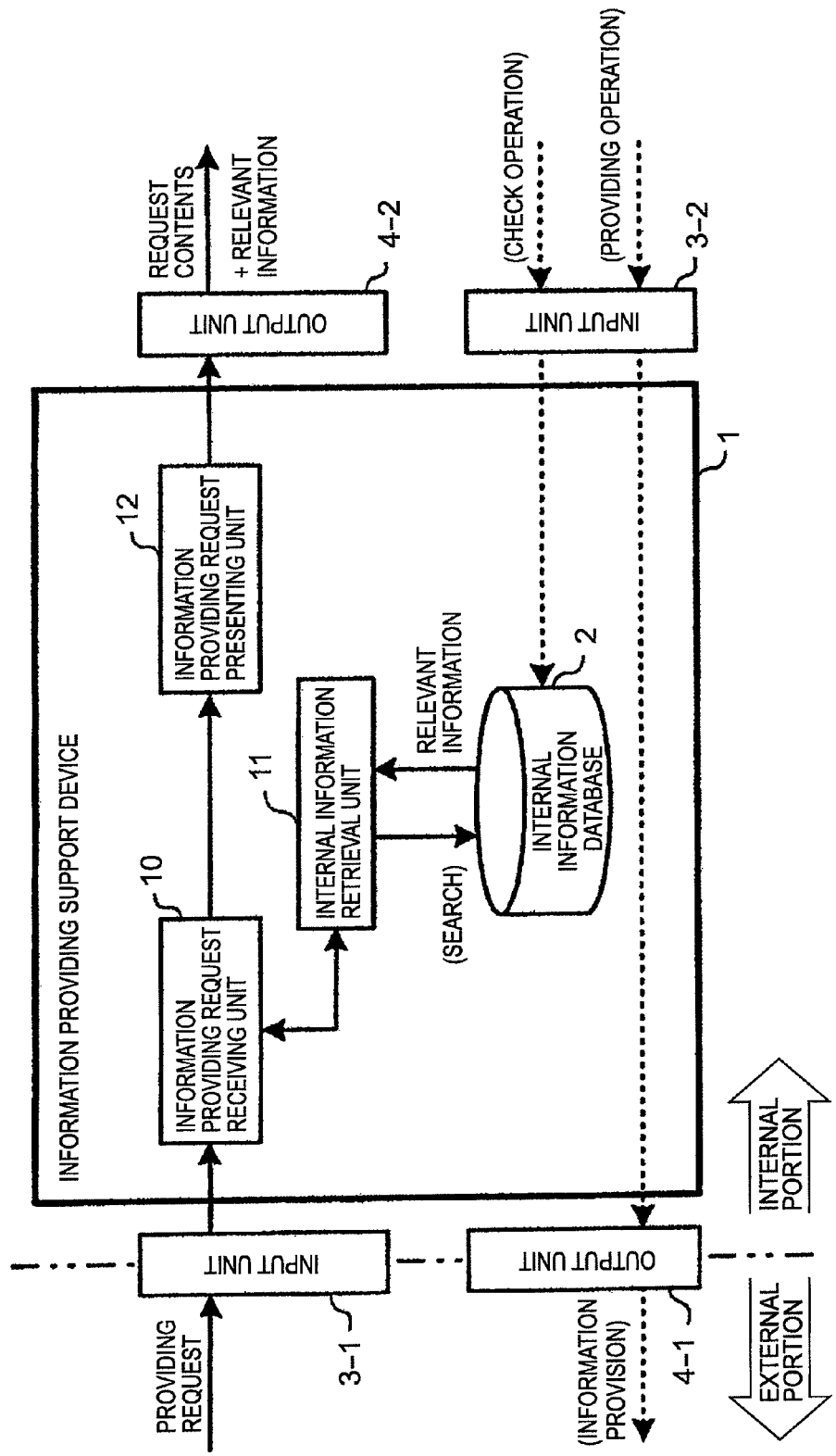
FIG. 2 is an explanatory diagram illustrating a configuration example of an information providing support device according to a first exemplary embodiment of this invention.

Further, FIG. 2 is an explanatory diagram illustrating a configuration example of the information providing support device 1 illustrated in FIG. 1 as a whole. The information providing support device 1 illustrated in FIG. 2 comprises the information providing request receiving unit 10, the internal information retrieval unit 11, the information providing request presenting unit 12, an internal information database 2, input units 3, and output units 4. The input units 3 comprise a first input unit 3-1 and a second input unit 3-2. The output units 4 comprise a first output unit 4-1 and a second output unit 4-2.

The information providing support device 1 is realized by, for example, a personal computer comprising the input units 3 such as a mouse, a keyboard, and a network card, the output units 4 such as a display, a speaker, and a network card, and a storage device constituting the internal information database 2 for retaining various kinds of information by a user using the device.

Note that in FIG. 2, the input unit and the output unit that are used for communications with an external device that cannot directly access information resources of the information providing support device 1 are illustrated as the first input unit 3-1 and the first output unit 4-1, respectively. Meanwhile, the input unit and the output unit that allow a person to input/output information directly to/from the information providing support device 1 are illustrated as the second input unit 3-2 and the second output unit 4-2, respectively. Note that the second input unit 3-2 and the second output unit 4-2 may perform communications with another device within an internal network which has access right to the information resources of the information providing support device 1. Specifically, the first input unit 3-1 and the first output unit 4-1 are realized by network cards for performing communications with the external device via a communication network. Meanwhile, the second input unit 3-2 and the second output unit 4-2 are realized by, for example, a mouse and a keyboard and a display and a speaker, respectively.

The information providing request receiving unit 10 receives an information providing request (for example, a question or a search formula) from an external portion by using the first input unit 3-1 without the intermediation of a user operation. Here, the request from the external portion represents a request made by another device connected via a network. The information providing request from the external portion, for example, may automatically arrive at (be received by) the first input unit 3-1 by the user setting RSS feeds or the like in a case where a question is registered in a predetermined community site. Further, the information providing request from the external portion, for example, may be transmitted automatically from a predetermined server. Further, for example, the internal information retrieval unit 11 may periodically access the predetermined server to cause the information providing request receiving unit 10 to periodically receive an information providing request retained by the server via the first input unit 3-1.

The internal information retrieval unit 11 retrieves information relevant to the information providing request received by the information providing request receiving unit 10 from the internal information database 2. The internal information database 2 is an the information storage device for memorizing information (including not only information input by the user but also information on a cache or a transmitted/received file) generated as a result of the user's operation on the information providing support device 1, the information storage device being accessible in principle only according to a request from the information providing support device 1. The internal information database 2 may not only be realized by a storage device actually incorporated into a casing of the information providing support device but also be realized by, for example, an external storage device connected from outside of the casing of the information providing support device as long as direct access can be made by the information providing support device. Note that the database expressed herein may not necessarily be such a database system as to manage meta data extracted for this invention in association with each other, but may be an information storage device for retaining information with identity (for example, a disk drive for retaining information as files identified by unique paths).

The information providing request presenting unit 12 uses the second output unit 4-2 to present a predetermined information manager (for example, a user) of the information providing support device 1 with the information providing request received by the information providing request receiving unit 10 and relevant information retrieved by the internal information retrieval unit 11 in association with each other.

Note that the information providing request receiving unit 10, the internal information retrieval unit 11, and the information providing request presenting unit 12 are realized by, for example, a CPU that operates according to application software (program) for information providing support. In this case, the application software (program) is memorized in the storage device, and the CPU reads the application software (program) to operate as the information providing request receiving unit 10, the internal information retrieval unit 11, and the information providing request presenting unit 12.

The above-mentioned application software (program) for information providing support may be recorded on a computer-readable recording medium.

Figure 3:
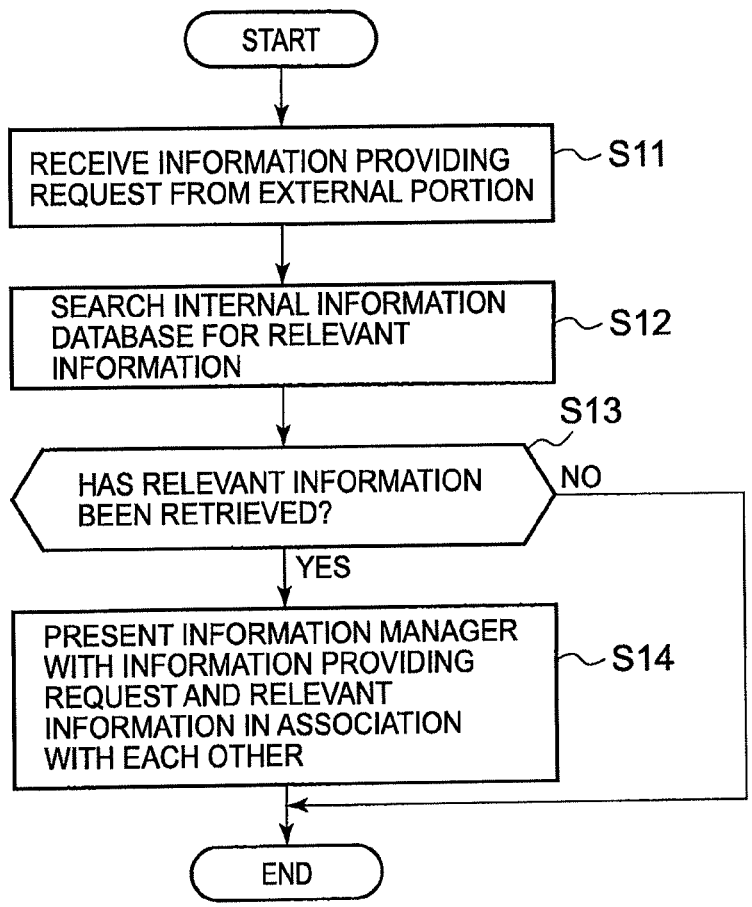
FIG. 3 is a flowchart illustrating an operation example of the information providing support device illustrated in FIG. 2.

Next, description is made of an operation of the information providing support device 1 according to the first exemplary embodiment. FIG. 3 is a flowchart illustrating an operation example of the information providing support device 1 according to the first exemplary embodiment.

As illustrated in FIG. 3, first, the information providing request receiving unit 10 receives an information providing request from an external portion (Step S11). Upon reception of the information providing request from another computer connected to an external network via the first input unit 3-1, the information providing request receiving unit 10 causes the internal information retrieval unit 11 to search the internal information database 2 for information relevant to the information providing request.

In response to an instruction issued from the information providing request receiving unit 10, the internal information retrieval unit 11 searches the internal information database 2 for the information relevant to the information providing request (Step S12).

Here, the relevant information specifically represents information that conforms to a search request performed by the internal information retrieval unit 11 with respect to the internal information database 2 based on the information providing request. For example, in a case where the information providing request is a keyword search formula and where the internal information retrieval unit 11 executes the search formula as it is with respect to the internal information database 2, the relevant information represents information that conforms to the keyword search formula (specifically, information including the keyword). Alternatively, in a case where the internal information retrieval unit 11 retrieves information by including synonyms for the keyword indicated by the search formula and words, meanings, expressions, and the like related thereto, the relevant information represents such information including synonyms for the keyword and words, meanings, and expressions related thereto. Alternatively, in a case, for example, where the information providing request is a question sentence for seeking a reply and where the internal information retrieval unit 11 executes a QA search for retrieving a reply to the question with respect to the internal information database 2, the relevant information represents information extracted as a result of the QA search (specifically, information judged to indicate the "answer" to the received question). Alternatively, for example, in a case of the question sentence for seeking a reply and in a case where the internal information retrieval unit 11 executes a QQ search for retrieving a question for deriving the reply to the question with respect to the internal information database 2, the relevant information represents information extracted as a result of the QQ search (specifically, information retained as the "question" approximate to the received question). Note that in a case where, based on a "question" retrieved as the information that conforms to a QQ search formula, the internal information retrieval unit 11 further executes a search formula for extracting an "answer" that fauns a pair with the "question", the relevant information includes information extracted based on the result of the QQ search (specifically, information on the "answer" retained in association with the question approximate to the received question).

Here, the QA search is a kind of question/response search, representing a search method of retrieving an "answer" to a given "question". For example, the QA search is a search method of finding a portion corresponding to a given question sentence to thereby retrieve a portion corresponding to the reply existing on a periphery thereof. Further, the QQ search is a kind of the question/response search as well, representing a search method of searching a database that preliminarily memorizes "questions" and "answers" in association with each other for a "question" approximate to a given "question" to thereby retrieve the "answer" to the given "question".

Subsequently, the information providing request receiving unit 10 determines whether or not the relevant information has been retrieved by the internal information retrieval unit 11 (Step S13). If the relevant information is retrieved (that is, if the relevant information exists within the internal information database 2), the information providing request receiving unit 10 causes the information providing request presenting unit 12 to present a received information providing request and the relevant information serving as search results in association with each other (Yes in Step S13). The information providing request presenting unit 12 receives a notification from the information providing request receiving unit 10, and presents the information manager with the information providing request in association with the relevant information via the second output unit 4-2 (Step S14). Note that in the presenting of the relevant information, information for indicating the relevant information, such as a location of the relevant information, may be presented. The information providing request presenting unit 12, specifically, outputs the information obtained by associating the information providing request with the relevant information to the second output unit 4-2 to thereby present the information provider therewith.

Meanwhile, if the relevant information is not retrieved (if the relevant information does not exist within the internal information database 2), the information providing request receiving unit 10 ends the procedure without notifying the information providing request presenting unit 12 (No in Step S13).

Figure 4:
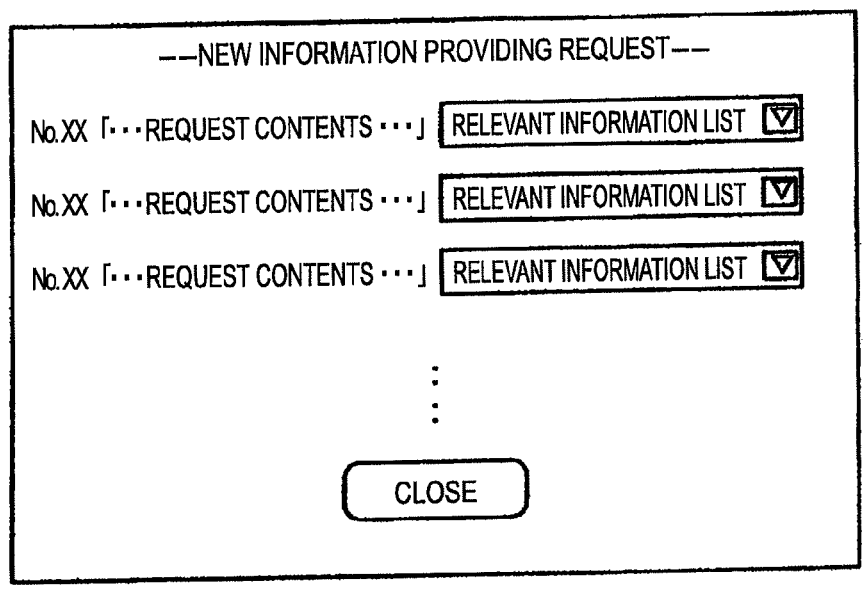
FIG. 4 is an explanatory diagram illustrating an example of an information providing request notification screen displayed by an information providing request presenting unit used for the information providing support device illustrated in FIG. 2.

The information providing request presenting unit 12 may present the information manager with the information providing request and the relevant information in association with each other by, for example, displaying an information providing request notification screen as illustrated in FIG. 4. Note that the information manager of the information providing support device 1 represents a person who is authorized to permit the provision of the information memorized in the internal information database 2 of the information providing support device 1. The information manager of the information providing support device 1 is generally the user of the information providing support device 1, but may be, for example, such a person as to be in charge of centrally managing information on computers used by a plurality of users. In such a case, the information may be transferred to a computer used by the person, and a new information providing request notification screen may be displayed. Note that the presenting is also made possible by transmitting electronic mail instead of displaying the information providing request notification screen. Further, in this case, the second input unit 3-2 and the second output unit 4-2 include a network card for transmitting/receiving information on the internal network.

FIG. 4 is an explanatory diagram illustrating an example of the information providing request notification screen displayed by the information providing request presenting unit 12. As illustrated in FIG. 4, the information providing request presenting unit 12 may display the retrieved relevant information in a list form by associating the information providing request subjected to the search with the relevant information. In the example illustrated in FIG. 4, the information providing request presenting unit 12 displays the respective items of the retrieved relevant information when a pull-down menu is clicked on.

According to such a configuration, the information providing request from the external portion is automatically received, the internal information retrieval unit 11 first searches the internal information database 2 for the relevant information, and if the relevant information exists, the information providing request presenting unit 12 presents the information manager with the information providing request from the external portion in association with the relevant information, which makes it possible to encourage a person (here, information manager) having an intention to provide information in providing safe and good quality information. That is, at a time point when the internal information retrieval unit 11 included in the information providing support device 1 searches the internal information database 2, no information is provided to the external portion at all, and only if the relevant information exists, the information manager can recognize the information providing request and judge whether or not to provide information in response to the request. Note that if the relevant information does not exist, time or labor is not necessary for the information manager at all. Accordingly, the problem with security and quality can be avoided by the information manager judging the provision adequacy, and even if the information manager is not monitoring all of the information providing requests, the information providing requests that have the relevant information at that time point can be responded without exception. Further, the relevant information is already in a retrieved state when the information manager sees the information providing request, and hence it is possible with reference to the relevant information to provide good quality information (for example, information free of error under wrong impression) and even information that has not been noticed by himself/herself.

Note that in the above-mentioned operation example, the description is made of the case where the information manager is presented with only the information providing request for which the relevant information has been retrieved, but it is possible to present the information providing request for which the relevant information has not been retrieved along with a result that the relevant information has not been retrieved.

First and Second Examples

Hereinafter, description is made of more specific examples of this invention with reference to the drawings.

Figure 5:
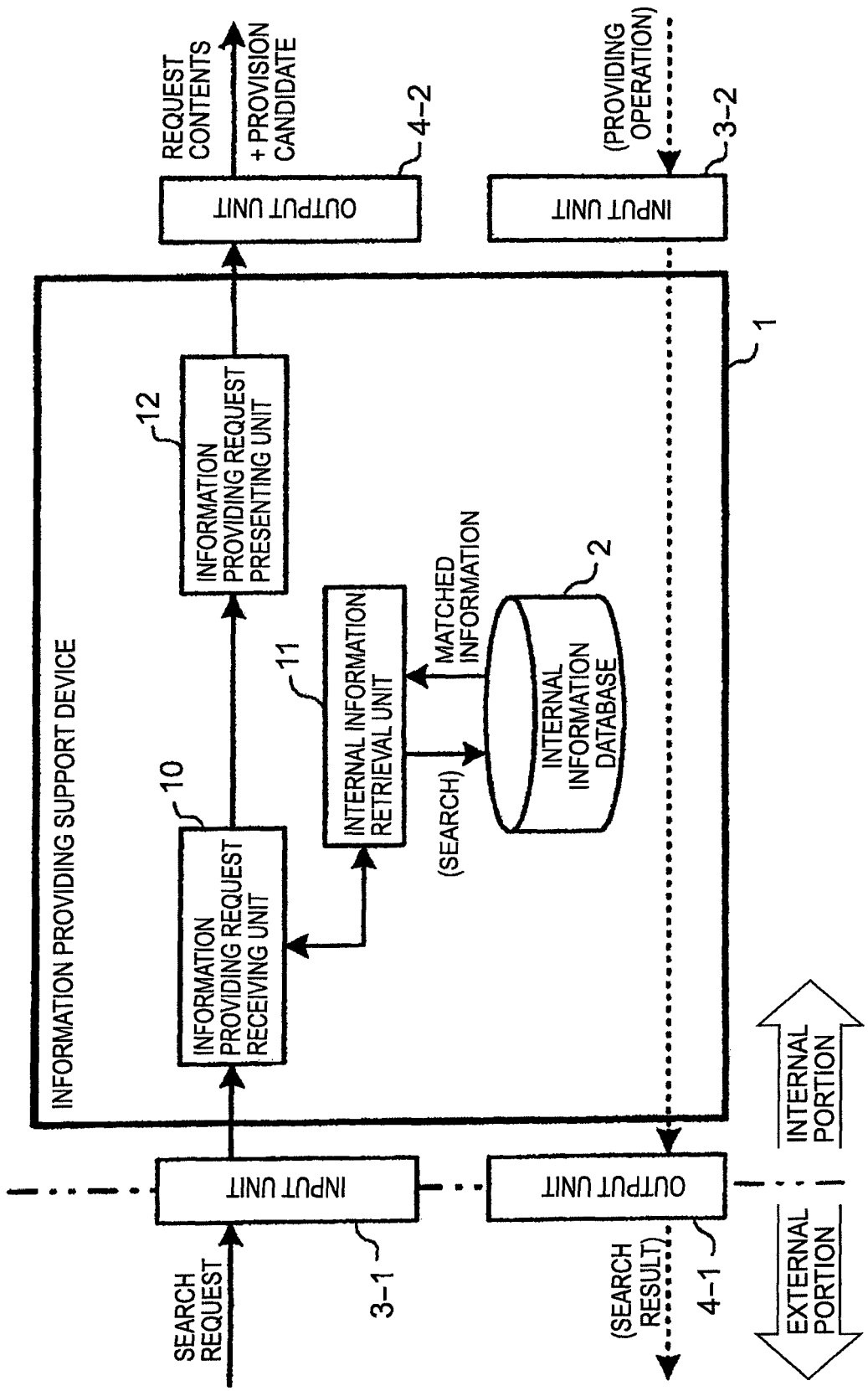
FIG. 5 is a block diagram illustrating an information providing support device according to a first example of this invention.
Figure 6:
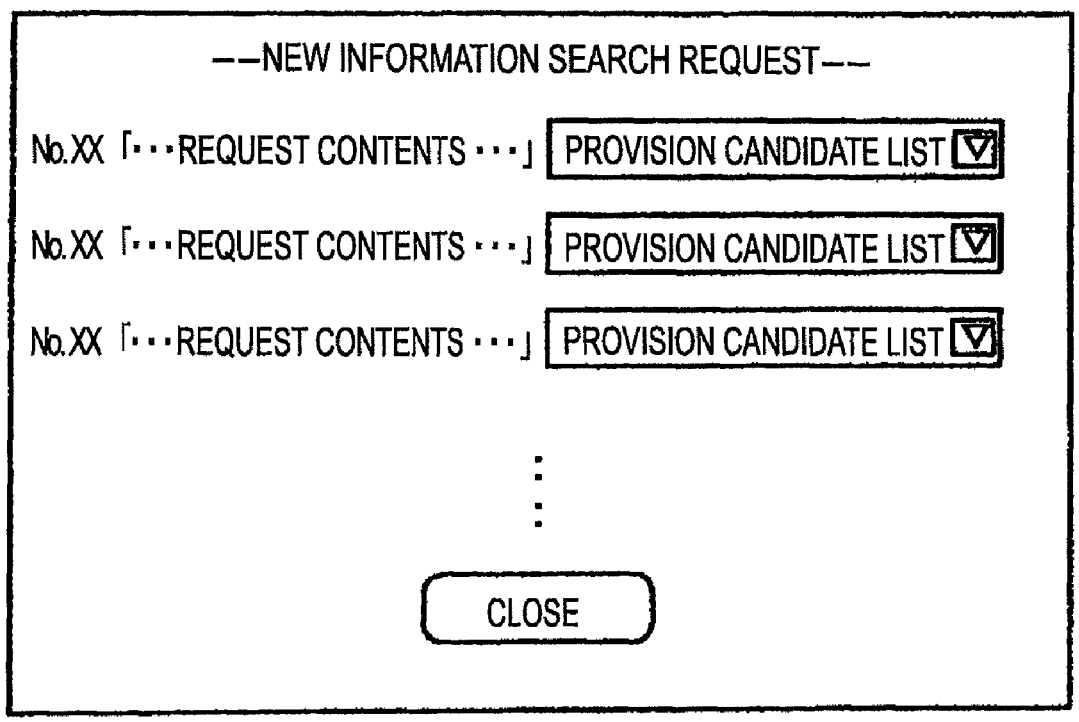
FIG. 6 is an explanatory diagram illustrating an example of the information providing request notification screen displayed by the information providing request presenting unit used for the information providing support device illustrated in FIG. 5.

FIG. 5 is a block diagram illustrating the information providing support device 1 according to a first example of this invention. FIG. 5 illustrates an example of the information providing support device 1 that receives the information providing request in a format of a search request with a keyword or the like being specified. In the example illustrated in FIG. 5, when the information providing request receiving unit 10 receives the search request via the first input unit 3-1, the internal information retrieval unit 11 executes a requested search with respect to the internal information database 2. Then, the information providing request presenting unit 12 displays the relevant information (here, information that conforms to the received keyword search formula) existing within the internal information database 2 searched by the internal information retrieval unit 11 in a list form of provision candidates in response to the search request as illustrated in FIG. 6. In the example illustrated in FIG. 6, the information providing request presenting unit 12 displays the respective items of the retrieved relevant information as the provision candidates when the pull-down menu is clicked on.

For example, if a sentence or a document that includes the keyword indicated by the received keyword search formula is retrieved as the relevant information, a provision candidate list may be the relevant information as it is in a list form of the provision candidates, or may be names of files including description of the relevant information and locations thereof in a list form of the provision candidates.

Further, the internal information retrieval unit 11 may be configured not only to perform a search with a keyword itself but also to include as search subjects synonyms for the keyword and words, meanings, expressions, and the like related thereto by using various dictionaries.

Note that, for example, it is also possible to receive a sentence or a document, instead of a word or a short character string, as a search key, and search for the relevant information by using a similar sentence search or a similar document search. In such a case, the internal information retrieval unit 11 may extract an independent word (content word) such as a noun, a verb, or an adjective from the search key, and may search for the sentence/document including the independent word. Further, in that case, the internal information retrieval unit 11 may extract a match with the search key as the relevant information based on the listed order of independent words or the frequencies thereof. In addition, the internal information retrieval unit 11 may perform a structural analysis on the sentence or the document (analysis of a syntactic structure, a context structure, or the like), and may judge a matching degree based on a similarity thereof.

Figure 7:
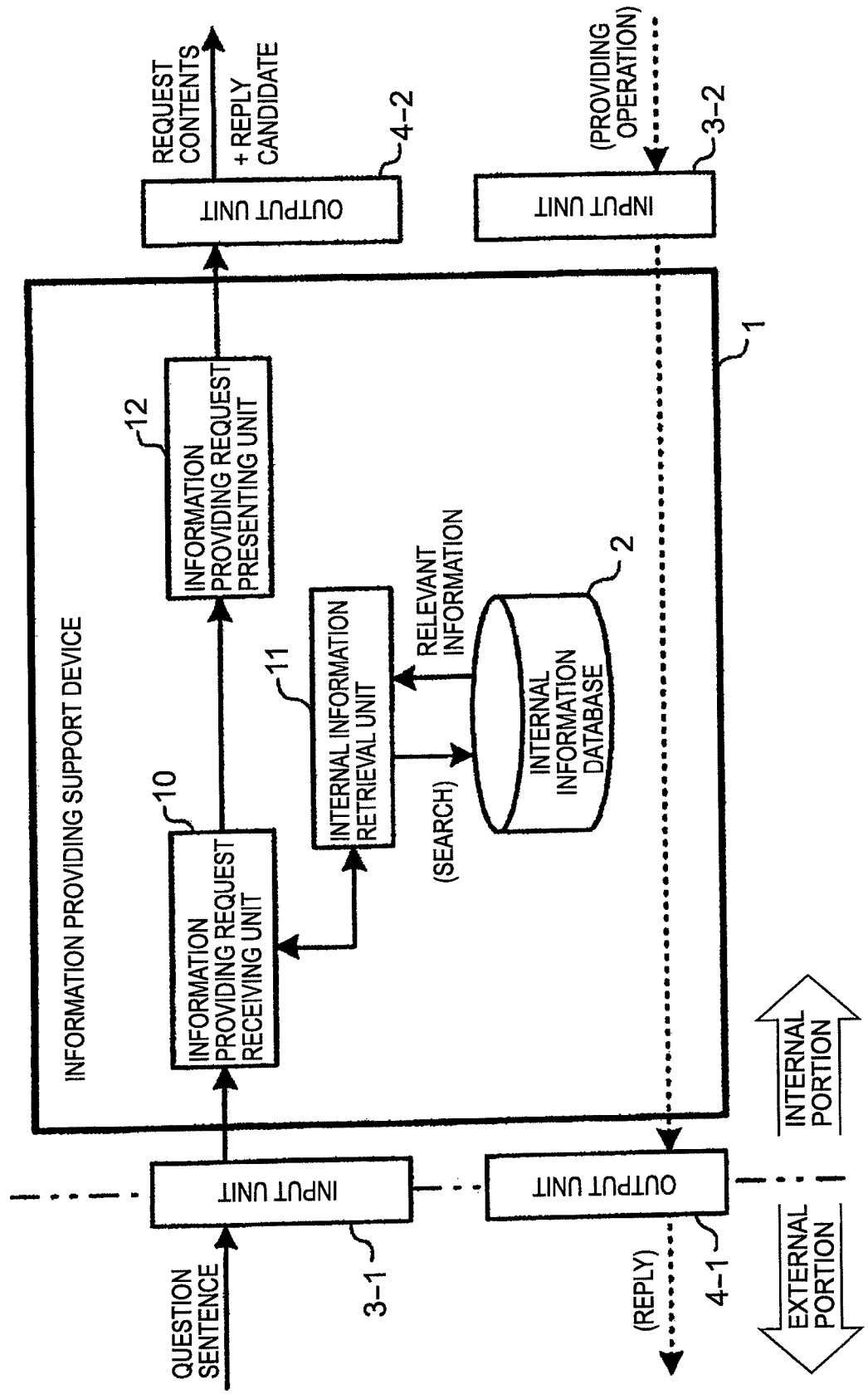
FIG. 7 is a block diagram illustrating an information providing support device according to a second example of this invention.
Figure 8:
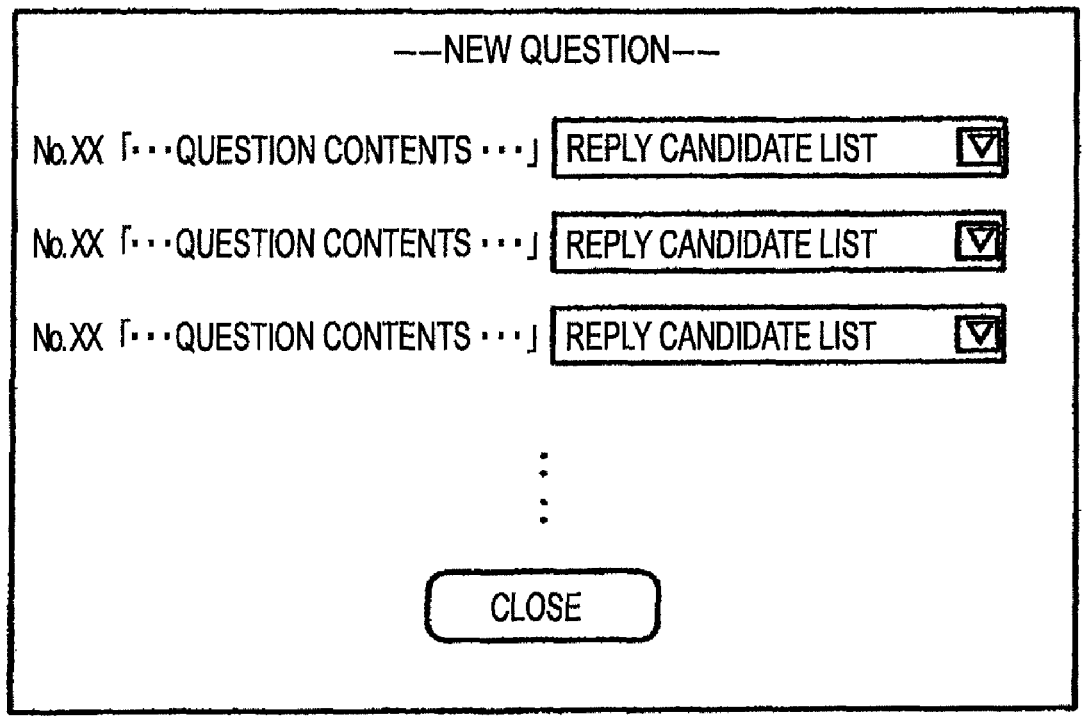
FIG. 8 is an explanatory diagram illustrating an example of the information providing request notification screen displayed by the information providing request presenting unit used for the information providing support device illustrated in FIG. 7.

Further, FIG. 7 is a block diagram illustrating the information providing support device 1 according to a second example of this invention. FIG. 7 illustrates an example of the information providing support device 1 that receives the information providing request in a format of the question document. In the example illustrated in FIG. 7, when the information providing request receiving unit 10 receives the question sentence via the first input unit 3-1, the internal information retrieval unit 11 is caused to execute a search formula for retrieving information serving as the answer to the received question sentence with respect to the internal information database 2. Then, the information providing request presenting unit 12 presents, based on contents of the question sentence, the relevant information (here, information that could correspond to the reply) existing within the internal information database 2 as a reply candidate list to the question sentence as illustrated in FIG. 8. In the example illustrated in FIG. 8, the information providing request presenting unit 12 displays the respective items of the retrieved relevant information as the provision candidates set as the replies when the pull-down menu is clicked on.

For example, as a question/response search processing, the internal information retrieval unit 11 may subject the internal information database 2 to the similar sentence search or the similar document search with the question sentence being set as the search key to thereby find the portion corresponding to the question sentence and further analyze whether or not the portion corresponding to the reply exists on the periphery thereof, and if the portion corresponding to the reply is found as a result of the analysis, may extract the information as the relevant information. Note that in the question/response search processing, the internal information retrieval unit 11 may change the information thus found into a form suitable for the reply to set the information as the relevant information.

In the first exemplary embodiment, for example, it is assumed that the question sentence "What is the third highest mountain in Japan?" is received from a question/response site on which the information provider replies to the posted question. In this case, if there exists a sentence including the same contents of the question and having an explicit relationship with the reply as in "The third highest mountain in Japan is Mount Okuhotaka.", a portion of the reply may be extracted. Alternatively, it is assumed that substantially the same contents of the question are included as in "I climbed Mount Okuhotaka this time. The name "Mount Okuhotaka" may not ring a bell. Everyone knows the highest mountain in Japan, but no one knows the third highest mountain.". In this case, assuming that the reply is described somewhere on the periphery thereof, the several lines before and after may be extracted as the relevant information.

Further, for example, even if expressions within the question sentence such as "third", "Japan", "mountain", and "high" do not appear directly as in "Mount Okuhotaka is the next highest after Mount Fuji and Mount Kita.", information with a meaning close to that of the contents of the question sentence (such as a document or a list table that indicates the "height" of the "mountain") may be extracted as the relevant information. Specifically, a sentence or document in which independent words similar to those within the question sentence exist may be extracted. Note that if the same independent words exist, a similar relationship is generally held, and it is highly probable that concepts of the contents of the question are included, but a totally different relationship can be exhibited as in, for example, "The third Japanese food restaurant I visited was situated in a quiet location in the mountains, and the food was very good but expensive.". In such a case, by considering a difference or the like between the number of independent words included in the question sentence and the number of independent words excluded from the question sentence or the like, the information may be judged not to be extracted as the relevant information or the like if the number of the excluded independent words is considerably larger than the number of the independent words included in the question sentence. Note that in this invention, the information is only extracted as the relevant information and is not provided to the external portion at this stage, and hence even the information expected to have little relevance may be extracted in a case where importance is placed on exhausitivity.

Note that, for example, it is assumed that the question sentence is not such a question as to lead to one answer as in "Please tell me a good way to freeze home-made curry for preservation.". Similarly in this case, the internal information database 2 may be subjected to the similar sentence search or the similar document search with the question sentence being set as the search key to thereby find the portion corresponding to the question sentence and further analyze whether or not the portion corresponding to the reply exists on the periphery thereof, and if the portion corresponding to the reply is found as a result of the analysis, the information may be extracted as the relevant information. Note that in response to such a question, there may exist a plurality of items of information (for example, sentences including the same contents of the question and having an explicit relationship with the reply) that can serve as reply candidates as in "Put it in a sealable bag, remove all the air inside, and freeze it for preservation.", "Put it in a Tupperware, close the lid tightly, and put it in the freezer after it cools down.", "The less ingredients, the better. Mash the potatoes.", "The onions are likely to be rotten, so keep them to a minimum if left in it.", and "It's easier to use if you divide it into small portions." Therefore, if there are a plurality of portions corresponding to the reply, all of the portions are extracted as the reply candidates.

Further, it is assumed that, for example, there exist data such as frequently asked questions (FAQs) that are obtained by collecting a large number of pairs of "questions" and "answers" corresponding thereto. In this case, the "question" similar to the input search key (question) is retrieved from within the data, and the "answer" that forms a pair with the retrieved "question" may be output. Note that based on the retrieved "answer", information restructured based on a difference from the question given as the search key may be output.

According to this invention, when the above-mentioned question is input, the internal information retrieval unit 11 searches the information managed by each information manager, and if the information or the relevant information serving as the reply (generically called relevant information) is retrieved, the information providing request presenting unit 12 presents the information manager therewith. The information manager may judge whether or not the presented information (information serving as the reply) is appropriate for the question or whether or not the information should be provided to the person who made the question, and then post the information onto the question/response site in a case where the information is appropriate for the question and can be provided. Alternatively, the information manager can reference the relevant information to thereby create and post the reply.

Here, as a technology related to this invention, there is an information providing support system in which if a person previously registers keywords relevant to field of his/her own specialty, the person is informed when a question relevant thereto is input. It is assumed that such an information providing support system receives an input of, for example, the question "What is the third highest mountain in Japan?" or the question "Please tell me where Mount Yari ranks in height in Japan.". In this case, if it is possible to inform a person who is well-acquainted with mountains of this question, it is highly probable to obtain the answer with just a word. However, for example, in this case, if the keyword "mountain" is registered, the keyword is so general that the person is notified of a large number of questions and needs to verify the questions one by one, while with the keyword "mount climbing", the relevance to those questions is hard to understand without consideration of even the meanings. Thus, it is generally difficult to predefine one's own specialty by keywords, and, for example, a person who happens to know the reply to the question of this example is not always interested in mountain climbing or well-acquainted with mountains in general.

According to this invention, it is not necessary to previously register the keyword or the field, the finding of the question and the extraction of the relevant information (including the creation of the reply candidates) are both performed under the initiative of a support application of the information providing support device 1, and hence a person who manages (owns) information can easily become the information provider without needing to take time and labor therefor.

For example, it is assumed that information relevant to given question contents happens to be written on a certain site. Even a person having an intention or an obligation to provide information may not want to bother to provide the reply after examination thereof when only the question contents in the field with which he/she is not well-acquainted are presented. Even in such a case, the user of this invention can easily become the information provider if the information is retained in the internal information database because she/he has already happened to access the site.

Further, there are many cases where an automatic search, in particular, an extraction technology for the reply candidates, is not so complete as to be appropriate for the reply. According to this invention, a person's acknowledgement can prevent erroneous information from being provided. Meanwhile, even without being automatically extracted as the reply candidate, the relevant information is already retrieved, and hence the information manager can conveniently create the reply while checking the contents of the information, which eliminates a fear that incorrect information may be provided depending on only his/her memory. As an example thereof, it is assumed that a list table of the heights of the major mountains in Japan exists within the internal information database 2. In this case, even if the reply to the question enumerated in the above-mentioned example cannot be automatically created from this table, as long as the table is presented as the relevant information, the information manager can easily derive the reply from the table to thereby provide the information.

Further, information including personal information such as a name, an address, a telephone number, and an ID and also confidential information exist in the managed information. In this invention, a person's acknowledgement can prevent information of this kind from being provided to the external portion. Meanwhile, even if a material/document itself includes the personal information or is confidential, there is often no problem with providing individual information as in the reply to the question enumerated in the example. According to this invention, it is possible to perform the information provision while handling such circumstances.

Besides, even if there exists no information suitable for the reply, a person who is well-acquainted with mountains because of being interested in mountain climbing or the like often possesses a large number of items of the relevant information. Accordingly, even if a search cannot be made directly for the reply to the question, in the case of possessing a large number of items of the relevant information in response to the question, the person may be judged to be well-acquainted with this field and prompted for a reply by the message "Do you think you can reply to this question?".

Second Exemplary Embodiment

Figure 9:
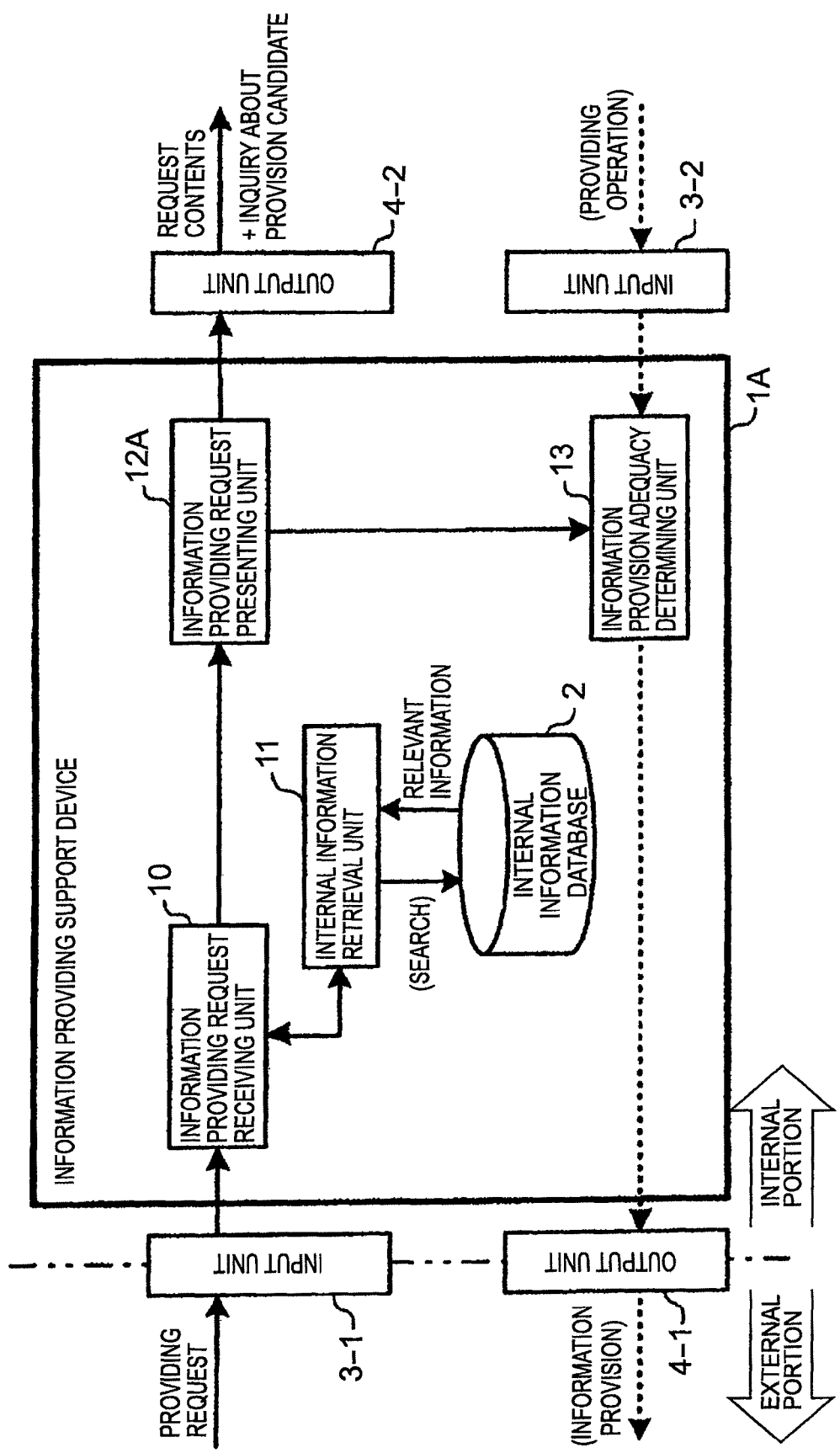
FIG. 9 is a block diagram illustrating a configuration example of an information providing support device according to a second exemplary embodiment of this invention.

FIG. 9 is a block diagram illustrating an information providing support device 1A according to a second exemplary embodiment of this invention. The information providing support device 1A according to the second exemplary embodiment has the same configuration as that of the information providing support device 1 according to the first exemplary embodiment illustrated in FIG. 2 except that an information provision adequacy determining unit 13 is further provided and that the operation of the information providing request presenting unit is different. Therefore, the information providing request presenting unit is denoted by reference symbol 12A. Hereinafter, the same components as those of the first exemplary embodiment are denoted by the same symbols as those of FIG. 2, and hence description thereof is omitted.

In a case where the relevant information retrieved by the information providing request presenting unit 12A is set as the provision candidates, the information provision adequacy determining unit 13 determines whether or not the relevant information can be provided.

In the second exemplary embodiment, the information providing request presenting unit 12A presents the retrieved relevant information as the provision candidates in response to the information providing request, and also presents information for making an inquiry as to the provision adequacy of the provision candidate. Then, the information provision adequacy determining unit 13 determines the provision adequacy of the relevant information set as the provision candidate according to the reply from the information manager to the inquiry made by the information providing request presenting unit 12A.

Note that the information providing request receiving unit 10, the internal information retrieval unit 11, the information providing request presenting unit 12A, and the information provision adequacy determining unit 13 are realized by, for example, a CPU that operates according to the application software (program) for information providing support. In this case, the application software (program) is stored in the storage device, and the CPU reads the application software (program) to operate as the information providing request receiving unit 10, the internal information retrieval unit 11, the information providing request presenting unit 12A, and the information provision adequacy determining unit 13.

The above-mentioned application software (program) for information providing support may be recorded on the computer-readable recording medium.

Figure 10:
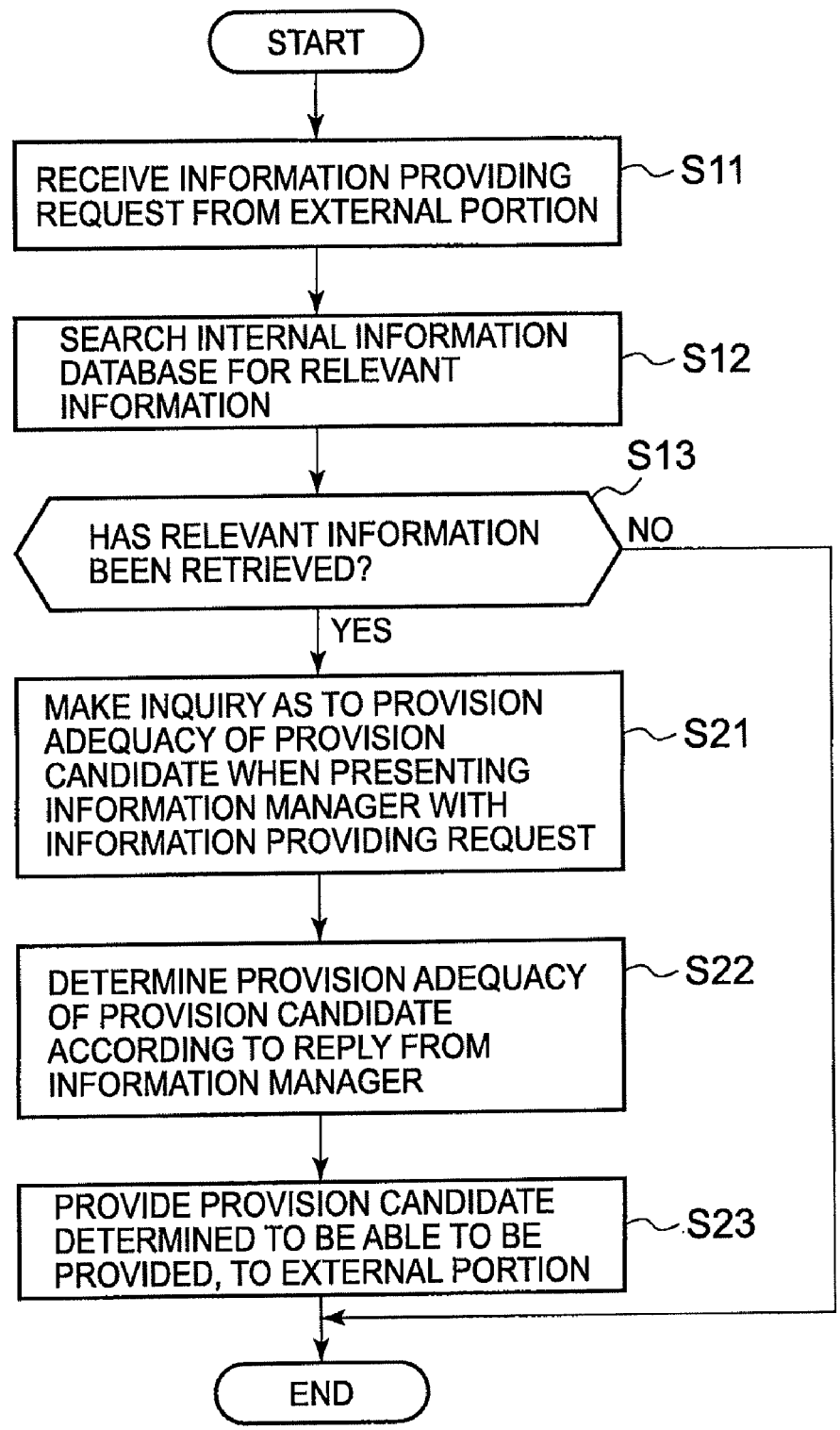
FIG. 10 is a flowchart illustrating an operation example of the information providing support device illustrated in FIG. 9.

Next, referring to the flowchart illustrated in FIG. 10, description is made of the operation of the information providing support device 1A according to the second exemplary embodiment. FIG. 10 is a flowchart illustrating an operation example of the information providing support device 1A according to the second exemplary embodiment. Note that in FIG. 10, Steps S11 to S13 are the same as Steps S11 to S13 illustrated in FIG. 3, and hence description thereof is omitted.

In this example, if the relevant information is retrieved by the internal information retrieval unit 11 (Yes in Step S13), the information providing request presenting unit 12A presents the relevant information corresponding to the information providing request as the provision candidate in association with the information providing request for which the relevant information has been retrieved, and further presents the information for making an inquiry as to the provision adequacy of the provision candidate (Step S21). Then, the information provision adequacy determining unit 13 determines the provision adequacy of the provision candidate (relevant information serving as the provision candidate) according to the reply from the information manager to the inquiry made by the information providing request presenting unit 12A (Step S22).

Figure 11:
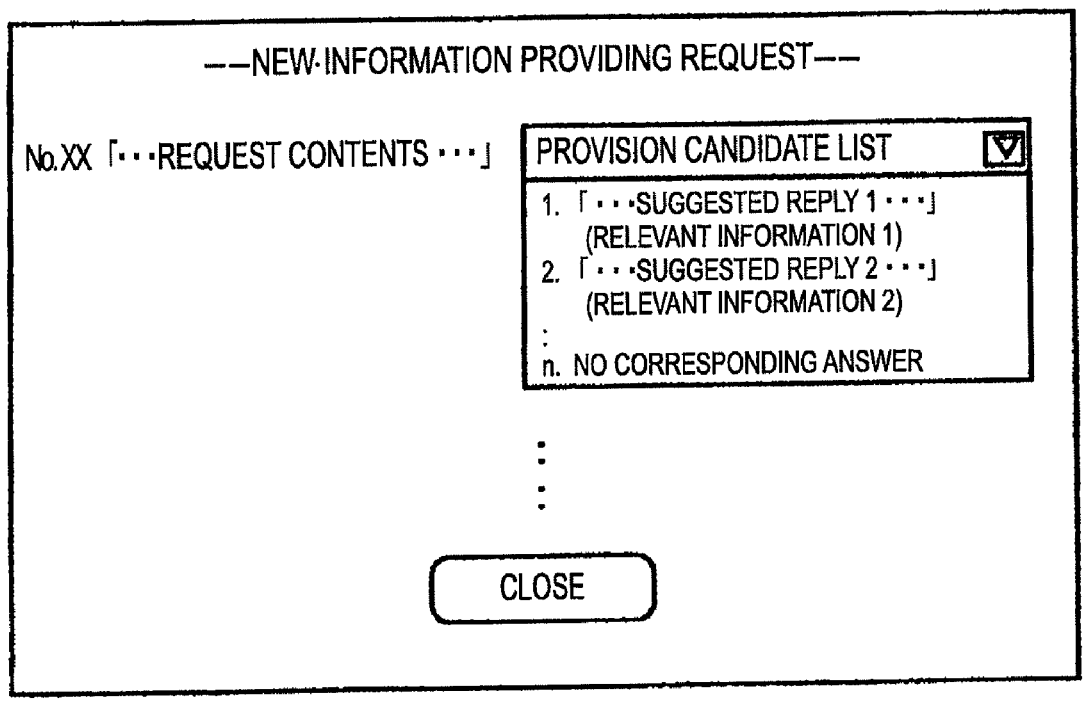
FIG. 11 is an explanatory diagram illustrating an example of the information providing request notification screen displayed by the information providing request presenting unit used for the information providing support device illustrated in FIG. 9.

For example, the information providing request presenting unit 12A may inquire the provision adequacy of each presented provision candidate, or may cause a selection to be made between one candidate (most suitable answer) that can be provided from among a plurality of provision candidates as illustrated in FIG. 11 and the message that none thereof can be provided (for example, "no corresponding answer").

Note that if the information manager permits the information provision, the information provision adequacy determining unit 13 may determine that the provision candidate can be provided to thereby provide the provision candidate to the external portion (information providing request source) via the first output unit 4-1 (Step S23). The information provision adequacy determining unit 13, for example, may provide the provision candidate (actually, relevant information retrieved by the internal information retrieval unit 11) which has been determined to be able to be provided by transmitting the provision candidate as the reply to the device from which the information providing request has been received. Note that the information provision adequacy determining unit 13 may be configured to provide information in such a manner that the information providing request receiving unit 10 is caused to return a reply to the received information providing request. Meanwhile, if the information manager does not permit the information provision, the information provision adequacy determining unit 13 determines that the provision candidate cannot be provided, and brings the procedure to an end as it is (without providing the provision candidate to the external portion).

Further, the information providing request presenting unit 12A may have a provision candidate creation function of performing creation (including editing) of the provision candidate according to the user operation. For example, the information providing request presenting unit 12A may display an information providing commission screen as illustrated in FIG. 12. The information providing commission screen illustrated in FIG. 12 includes information for commissioning the information provision regarding the received information providing request, the contents of the received information providing request, an information providing requester, an information editing button for instructing to subject each item of relevant information to the editing for provision along with file information (for example, file name and creation date/time) on the retrieved relevant information, and a selection box for selecting a subject for which the provision is to be permitted. In addition, the information providing commission screen includes a provision permitting button for instructing to permit the provision of the selected information, an individually replying button for instructing to make a reply individually, and a provision disabling button for instructing to disable the provision.

For example, the information providing request presenting unit 12A may be configured to present, in response to depression of the information editing button, the contents of the relevant information corresponding to the instruction and display an editing screen for causing the contents to be edited. For example, after presenting the contents of the relevant information onto the editing screen, the information providing request presenting unit 12A may cause the user to edit the relevant information and may set the edited relevant information as the provision candidate. Note that after the editing, it may be displayed on the information providing commission screen that the relevant information has been edited. Further, for example, the information provision adequacy determining unit 13 may be configured to be notified, in response to the depression of the provision permitting button or the provision adequacy button, of the reply from the information manager regarding the provision adequacy of the presented provision candidates (here, the relevant information retrieved and left as it is or the edited relevant information). If the provision permitting button is depressed, the information provision adequacy determining unit 13 is notified that the reply indicating that the provision candidate having a checked selection box can be provided has been made. If the provision disabling button is depressed, the information provision adequacy determining unit 13 is notified that the reply indicating that all of the presented provision candidates cannot be provided has been made. Note that the information provision adequacy determining unit 13 can be configured to be notified of the edited relevant information as the provision candidate which has been permitted to be provided at a time instant when the editing operation is ended on the editing screen. Further, for example, a reply creation screen may be displayed in response to the depression of the individually replying button. For example, the information providing request presenting unit 12A may cause the user to create provision information on the reply creation screen, and the information provision adequacy determining unit 13 may be notified of the created information as the provision candidate which has been permitted to be provided.

Such an information providing commission screen allows the information manager to provide the relevant information as it is after recognition thereof, or to instruct to subject the relevant information to the editing for the provision and provide the information from which the personal information, secret information, or the like is deleted. Further, even if there exists no information that fully conforms to the requested contents because the requested contents correspond to an exceptional case or the like, it is also possible to create the information to be provided by instructing the individual replying. Note that in order to create the provision information, it is also possible to refer the presented relevant information.

Third Exemplary Embodiment

Figure 13:
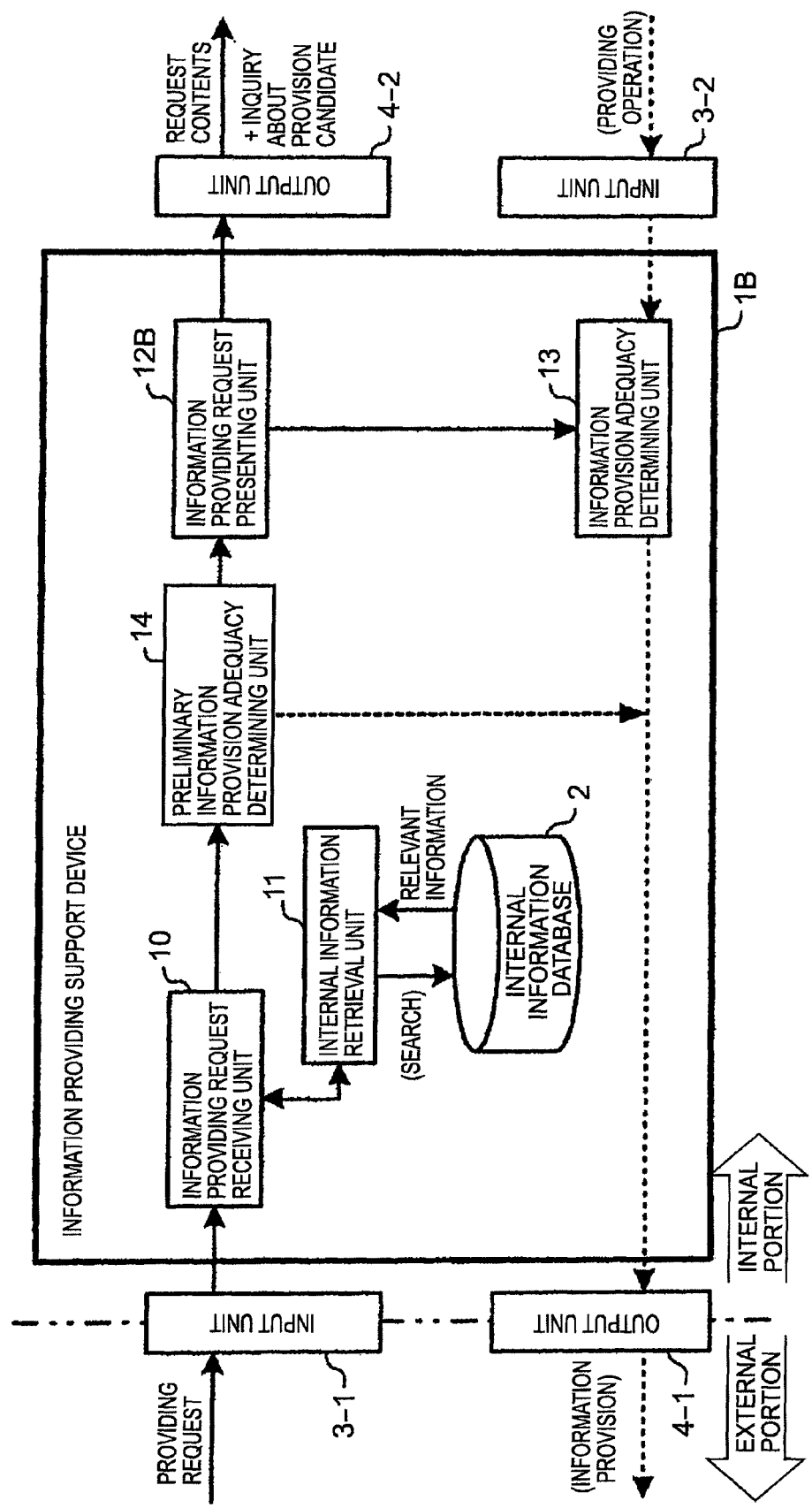
FIG. 13 is a block diagram illustrating a configuration example of an information providing support device according to a third exemplary embodiment of this invention.

FIG. 13 is a block diagram illustrating a configuration example of an information providing support device 1B according to a third exemplary embodiment of this invention. The information providing support device 1B according to the third exemplary embodiment is different from the information providing support device 1A according to the second exemplary embodiment illustrated in FIG. 9 in that a preliminary information provision adequacy determining unit 14 is additionally provided and that the operation of the information providing request presenting unit is different. Therefore, the information providing request presenting unit is denoted by reference symbol 12B.

The preliminary information provision adequacy determining unit 14 once determines the provision adequacy of the relevant information set as the provision candidate based on a security risk level of the retrieved relevant information, a conformity with the information providing request, or a combination thereof before the information providing request presenting unit 12B presents the information manager with the information. Then, the relevant information to be inquired of the information manager is screened based on the determination result. Note that in the third exemplary embodiment, in response to a screening result obtained by the preliminary information provision adequacy determining unit 14, the information providing request presenting unit 12B presents the information manager with only the provision candidate that needs to be inquired of the information manager according to the judgment, and makes the inquiry of him/her. Note that the information provision adequacy determining unit 13 determines the provision adequacy of the relevant information inquired by the information providing request presenting unit 12B according to the reply from the information manager to the inquiry in the same manner as the information providing support device 1A according to the second exemplary embodiment.

Note that the information providing request receiving unit 10, the internal information retrieval unit 11, the information providing request presenting unit 12B, the information provision adequacy determining unit 13, and the preliminary information provision adequacy determining unit 14 are realized by, for example, a CPU that operates according to the application software (program) for information providing support. In this case, the application software (program) is stored in the storage device, and the CPU reads the application software (program) to operate as the information providing request receiving unit 10, the internal information retrieval unit 11, the information providing request presenting unit 12B, the information provision adequacy determining unit 13, and the preliminary information provision adequacy determining unit 14.

The above-mentioned application software (program) for information providing support may be recorded on the computer-readable recording medium.

Figure 14:
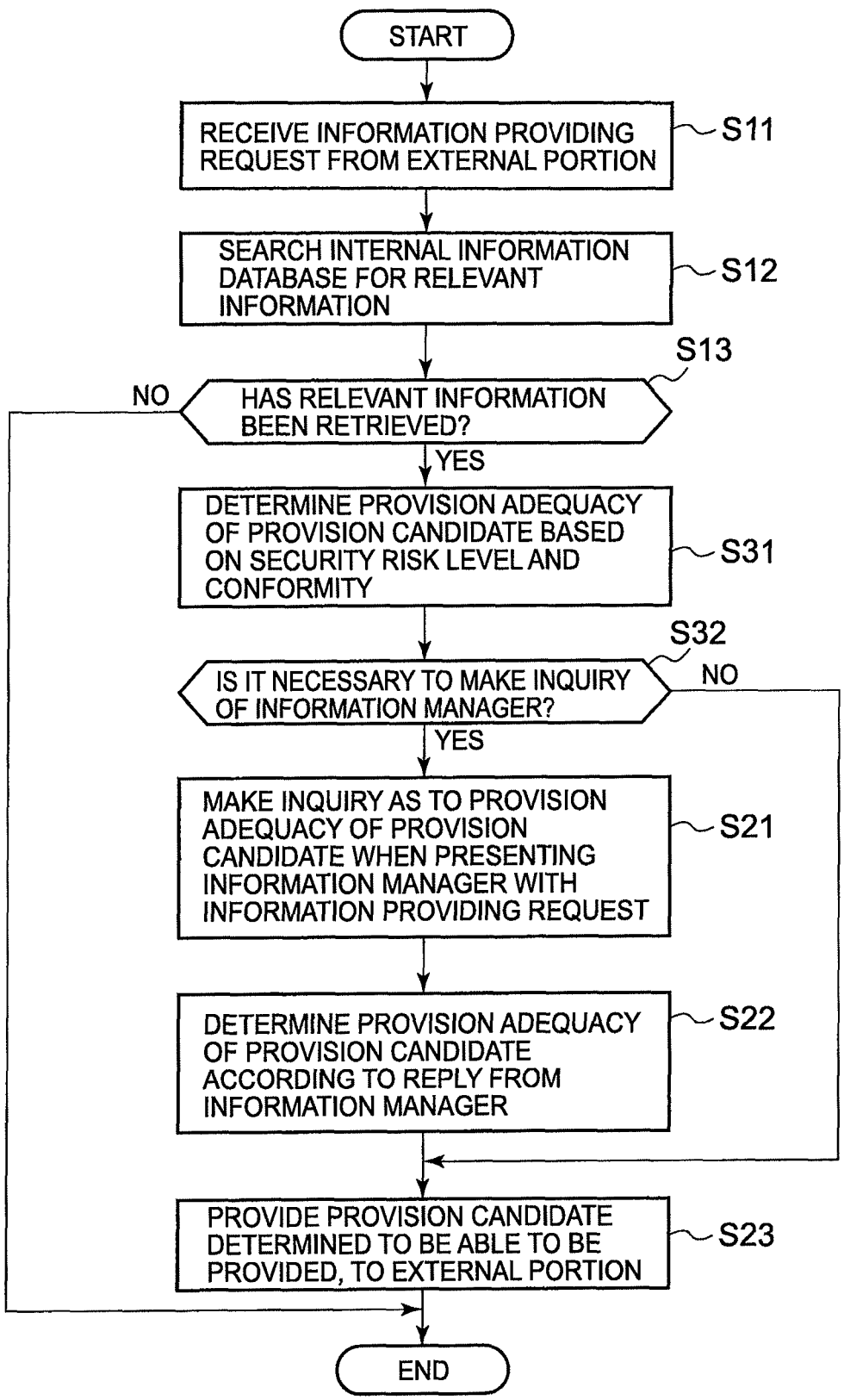
FIG. 14 is a flowchart illustrating an operation example of the information providing support device illustrated in FIG. 13.

Next, referring to the flowchart illustrated in FIG. 14, description is made of the operation of the information providing support device 1B according to the third exemplary embodiment. FIG. 14 is a flowchart illustrating an operation example of the information providing support device 1B according to the third exemplary embodiment. Note that in FIG. 14, Steps S11 to S13 and S21 to S23 are the same as Steps S11 to S13 and S21 to S23 illustrated in FIG. 10, and hence description thereof is omitted.

In the third exemplary embodiment, if the relevant information is retrieved by the internal information retrieval unit 11 (Yes in Step S13), the preliminary information provision adequacy determining unit 14 determines the provision adequacy of the relevant information as the provision candidate based on the security risk level of the retrieved relevant information, the conformity with the information providing request, or the combination thereof, and screens the relevant information to be inquired of the information manager according to the determination result (Step S31).

The information providing request presenting unit 12B presents the information manager with the provision candidate screened by the preliminary information provision adequacy determining unit 14, and makes the inquiry of him/her (Yes in Step S32, Step S21).

Note that the provision candidate that has not been screened by the preliminary information provision adequacy determining unit 14 as having no need to be inquired of the information manager may not be presented to the information manager, but may be provided to the external portion (information providing request source) via the first output unit 4-1 according to the determination result obtained in Step S31 (Step S23).

The information providing support device 1B according to the third exemplary embodiment is configured to screen the information providing request and the provision candidate by automatically determining the provision adequacy of each provision candidate in Step S31 so as to present only the information providing request regarding the information provision candidate existing in a gray zone from the viewpoint of the security and quality and the provision candidate.

For example, the preliminary information provision adequacy determining unit 14 may perform preliminary determination of the provision adequacy and decision of necessity of the inquiry according to the determination result in the following manners.

First, description is made of the preliminary determination of the provision adequacy. The preliminary information provision adequacy determining unit 14, for example, may determine the provision adequacy based on whether or not the security risk level of the relevant information satisfies a predetermined value. Here, the security risk level represents an index that indicates a level of a risk of leakage of the personal information or secret information occurring by providing the information. The security risk level, for example, may be calculated based on an appearance frequency obtained by previously retaining information corresponding to the personal information or confidential matters as a dictionary and detecting how much information retained in the dictionary is included in the relevant information. Further, in a case where security risk values are previously assigned to folders and files, a value assigned to the file in which the relevant information is stored or the folder in which the file is stored may be read to be set as the security risk level. Note that the security risk values previously assigned to the folder and the file and the appearance frequency of the personal information or confidential matters detected from the document contents may be counted to thereby calculate a final security risk level. Further, the presence or absence of the risk may be changed over depending on where the information providing request comes from (for example, a security risk involving the confidential matters does not occur in a case of the question from inside a company). Note that the preliminary information provision adequacy determining unit 14 may determine the information having the security risk level not satisfying a first threshold value as being "unprovidable", determine the information having the security risk level satisfying a second threshold value higher than the first threshold value as being "providable", and determine the information other than the above-mentioned information as having "unknown provision adequacy".

Further, the preliminary information provision adequacy determining unit 14 may determine the provision adequacy depending on whether or not the conformity of the relevant information with the information providing request satisfies the predetermined value. Here, the conformity with the information providing request represents an index that indicates how much the contents requested by the information providing request are matched. The conformity with the information providing request may use a value calculated as a search score by the internal information retrieval unit 11. The search score, for example, may be a value calculated based on the similarity between the question sentence indicated by the information providing request and a search subject sentence used when the relevant information is retrieved. Here, the search subject sentence represents information that is subjected to the determination as to whether or not to extract the relevant information in searching the internal information database 2 for the relevant information serving as the provision candidate. For example, in a case where the information providing request is the search request, the relevant information serving as the provision candidate is considered to be information that matches the search request contents, and hence the search subject sentence for this case corresponds to a sentence subjected to the determination as to whether or not to match the search request contents stored in the internal information database 2 when the relevant information is extracted. Alternatively, for example, in a case where the information providing request is a request to seek an answer to the question, the relevant information serving as the provision candidate is considered to be information extracted based on the search results for information that is similar to the question contents, and hence the search subject sentence for this case corresponds to a sentence subjected to the determination as to whether or not to be similar to the question contents stored in the internal information database 2 when the relevant information is extracted. Note that the similarity between the question sentence and the search subject sentence, for example, may be the similarity of an appearance frequency distribution of words included in the question sentence, the similarity of an order of words or further an order of character strings that also include words that are not independent words (such as accessory words), or the similarity of a syntactic structure (modification) or a semantic structure. Note that the words included in the question sentence include the keyword used for a keyword search. Further, all of the words included in the question sentence may be subjected, or only the independent words may be subjected. Further, the frequency within the search subject sentence may be an absolute frequency or a relative frequency.

For example, in the case of the keyword search, the internal information retrieval unit 11 may calculate the search score by raising the search score as the appearance frequency of the search keyword included in the search result becomes higher, by inhibiting the raising of the score for which the appearance frequency is high in the search result but the frequency is also high in the entire document (method of removing an influence of a general word high in appearance frequency as a whole; tf-idf method), or by determining an importance of the document with the use of a link destination or the like. Further, for example, in a case of the similar sentence search or the similar document search, the similarity with the question document based on the listed order of the words, the frequencies thereof, or the structures of the sentence or the document may be obtained as the search score. Further, for example, in a case of the question/response search, the highest search score may be set for the information that includes the question as it is and exhibits an explicit relationship with the reply, and in the other cases, the similarity judged based on the listed order of the independent words included in the question sentence or the frequencies thereof may be set as the search score.

Further, for example, as the similarity of the syntactic structure, the internal information retrieval unit 11 may assume linguistic units such as phrases and clauses of a text as its elements, define the text as a syntactic tree that expresses modifications between bunsetsus, and the similarity between the syntactic trees may be obtained. For example, the document "TAKAHASHI Tetsuro and two others, "Methods for Estimating Syntactic Similarity", Information Processing Society of Japan (incorporated association), July 2002, Vol. 2002, No. 66, p. 163-170" (Non-patent Document 2) discloses, as examples of the methods for estimating a similarity between syntactic trees, methods for realizing quantification of the similarity between corresponding nodes and collation that allows a leap over a node.

Further, for example, the internal information retrieval unit 11 may express the semantic structure by using a graph and set the similarity between the graphs as the similarity of the semantic structure. A hierarchical directed acyclic graph (HDAG), which is a directed acyclic graph allowing a hierarchy and uniformly expresses structures within a text, is proposed as an example of a method of expressing the semantic structure by using a graph. For example, the document "SUZUKI JUN and two others, "Hierarchical Directed Acyclic Graph Kernel", IEICE Transactions on Information and Systems, Pt. 2, The Institute of Electronics, Information and Communication Engineers (incorporated association), February 2005, Vol. J88-D-2, No. 2, p. 230-240" (Non-patent Document 3) discloses an example of using the hierarchical directed acyclic graph as a text expression format and of computation between texts using a graph kernel for computing the similarity between the graphs.

Further, the preliminary information provision adequacy determining unit 14 may also determine, as being providable, the provision candidate that has the security risk level of the relevant information satisfying the predetermined value and has the conformity with the information providing request satisfying the predetermined value.

Next, description is made of the decision of the necessity of the inquiry with respect to the determination result. The necessity of the inquiry with respect to the determination result by the preliminary information provision adequacy determining unit 14 possibly has such patterns as follows.

(Pattern 1)

The "providable" is determined.→The provision is automatically performed with no inquiry (no presentation) performed with respect to the information manager.

The provision adequacy is unknown.→The presentation (inquiry) is performed with respect to the information manager.

The "unprovidable" is determined.→The provision is disabled with no inquiry (no presentation) performed with respect to the information manager.

This pattern is a pattern in which the determination results obtained by the preliminary information provision adequacy determining unit 14 are set to be effective and the preliminary information provision adequacy determining unit 14 screens only the provision candidates having the unknown provision adequacy as the inquiry subjects. In this case, the provision candidate determined to be providable as a result of the determination performed by the preliminary information provision adequacy determining unit 14 and the provision candidate selected as being providable in the reply from the information manager from among the provision candidates determined as having the unknown provision adequacy according to the determination performed by the preliminary information provision adequacy determining unit 14 are finally judged to be able to be provided. Further, the provision candidate determined as being unprovidable by the preliminary information provision adequacy determining unit 14 is judged to be unprovidable without being recognized by the information manager. Further, the provision candidate determined as being providable by the preliminary information provision adequacy determining unit 14 is judged to be providable without being recognized by the information manager.

(Pattern 2)

The "providable" is determined.→The presentation (inquiry) is performed with respect to the information manager.

The provision adequacy is unknown.→The presentation (inquiry) is performed with respect to the information manager.

The "unprovidable" is determined.→The provision is disabled with no inquiry (no presentation) performed with respect to the information manager.

This pattern is a pattern in which the provision candidates determined as being unprovidable by the preliminary information provision adequacy determining unit 14 is set to be unprovidable and the other provision candidates are screened as the inquiry subject. In this case, as a result of the determination performed by the preliminary information provision adequacy determining unit 14, the provision candidate determined to be providable or selected as being providable in the reply from the information manager from among the provision candidates determined as having the unknown provision adequacy is finally judged to be able to be provided. Further, the provision candidate determined as being unprovidable by the preliminary information provision adequacy determining unit 14 is judged to be unprovidable without being recognized by the information manager. Note that in this pattern, the provision candidate is not judged to be providable without being recognized by the information manager, and hence it becomes possible to perform the information provision more reliably in terms of safety.

(Pattern 3)

The "providable" is determined.→The provision is automatically performed with no inquiry (no presentation) performed with respect to the information manager.

The provision adequacy is unknown.→The presentation (inquiry) is performed with respect to the information manager.

The "unprovidable" is determined.→The presentation (inquiry) is performed with respect to the information manager.

This pattern is a pattern in which the provision candidates determined as being providable by the preliminary information provision adequacy determining unit 14 is set to be providable and the other provision candidates are screened as the inquiry subject. In this case, as a result of the determination performed by the preliminary information provision adequacy determining unit 14, the provision candidate determined to be unprovidable or selected as being providable in the reply from the information manager from among the provision candidates determined as having the unknown provision adequacy is finally judged to be able to be provided. Further, the provision candidate determined as being providable by the preliminary information provision adequacy determining unit 14 is judged to be providable without being recognized by the information manager. Note that in this pattern, the provision candidate is not judged to be unprovidable without being recognized by the information manager, and hence it becomes possible to provide more information while reducing the load on the information manager.

(Pattern 4)

The "providable" is determined.→The presentation (inquiry) is performed with respect to the information manager.

The provision adequacy is unknown.→The provision is disabled with no inquiry (no presentation) performed with respect to the information manager.

The "unprovidable" is determined.→The provision is disabled with no inquiry (no presentation) performed with respect to the information manager.

This pattern is a pattern in which the provision candidates determined as being unprovidable by the preliminary information provision adequacy determining unit 14 and the provision candidates determined as having the unknown provision adequacy are set to be unprovidable and the provision candidates determined to be providable are screened as the inquiry subject. In this case, as a result of the determination performed by the preliminary information provision adequacy determining unit 14, the provision candidate selected as being providable in the reply from the information manager from among the provision candidates determined to be providable is finally judged to be able to be provided. Further, the provision candidate not determined as being providable by the preliminary information provision adequacy determining unit 14 is judged to be unprovidable without being recognized by the information manager. Note that this pattern is adopted when more safety is desired while reducing the load on the information manager.

Thus, in actuality, in a case where time and labor may rather increase if a person makes replies for the provision adequacy one by one, the time and labor can be reduced by causing the automatic determination to be performed only in a case where the provision adequacy is reliably known.

Figure 15:
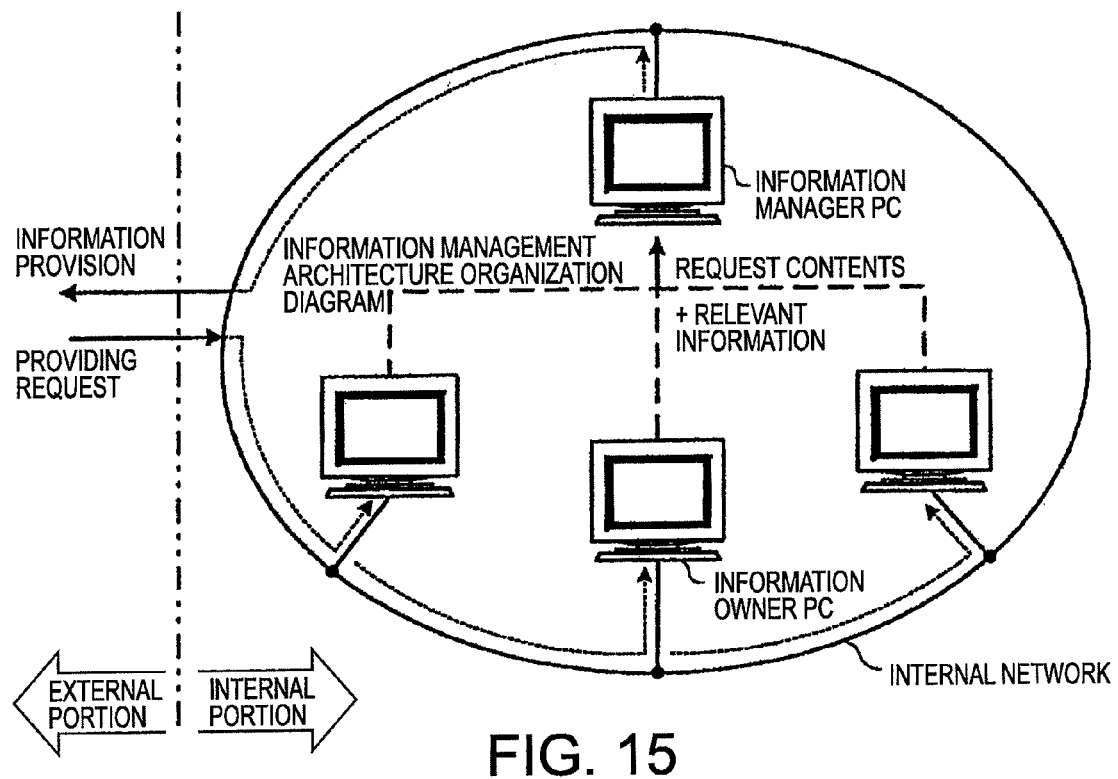
FIG. 15 is a block diagram schematically illustrating a configuration example of an information providing support system.

FIG. 15 is a block diagram schematically illustrating a configuration example of the information providing support system constituted by computers connected to the internal network. It is assumed that, as described above, the information manager is not the user of a computer owning the relevant information (hereinafter, referred to as "information owner PC"). In this case, in the information providing support device 1 according to the first exemplary embodiment, the information providing request presenting unit 12 of the information owner PC, for example, may use groupware installed on each PC for sharing information on the internal network to cause a display unit of a computer (hereinafter, referred to as "information manager PC") used by the information manager to display the request contents and the relevant information in association with each other. Further, for example, the presentation may be performed with respect to the information manager by sending electronic mail described in HTML for displaying the information providing request notification screen to the information manager PC. Then, the information manager may verify information presented (displayed) onto the information manager PC and present the information judged to be able to be provided to the external portion.

Figure 16:
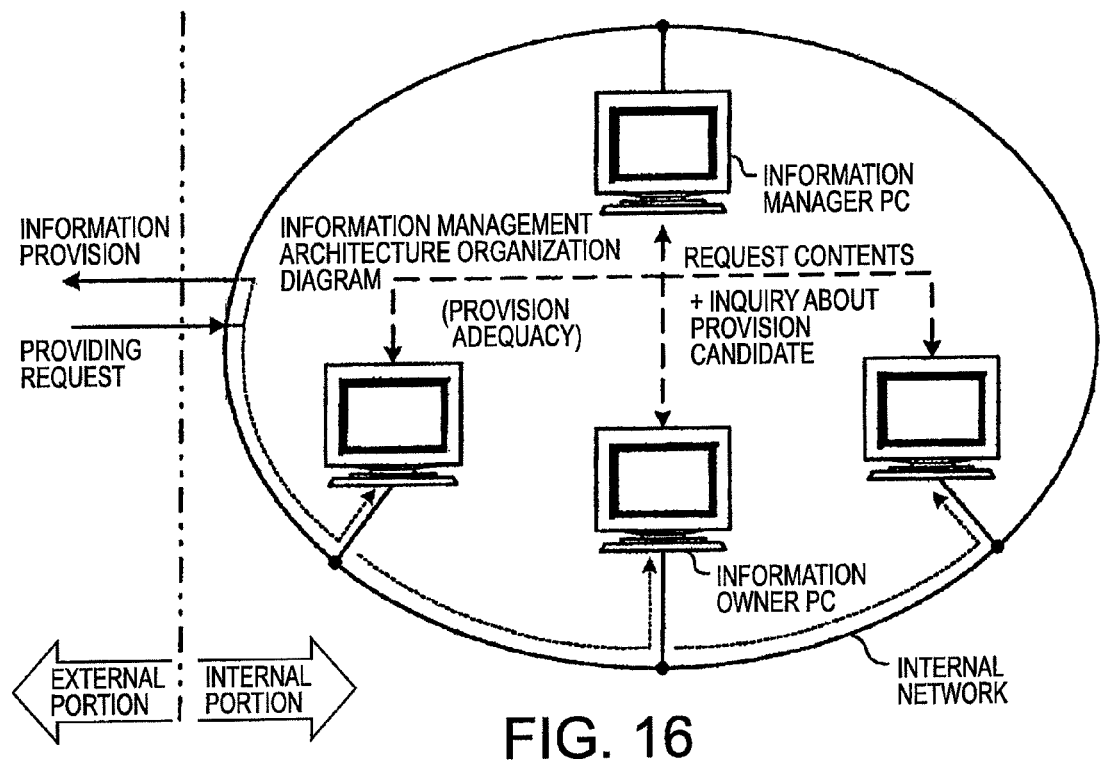
FIG. 16 is a block diagram schematically illustrating a configuration example of the information providing support system.

FIG. 16 is a block diagram schematically illustrating a configuration example of the information providing support system constituted by the computers connected to the internal network. For example, the information providing support devices 1A and 1B according to the second and third exemplary embodiments, the information providing request presenting units 12A and 12B of the information owner PC may make an inquiry so that the information owner PC being a sender is notified of the reply of the provision adequacy from the information manager. For example, a circular function of the groupware, a function of sending mail through an HTML screen operation, or the like may be used. In this case, the information manager may make the reply for the provision adequacy by selecting the most relevant information from among search results obtained by a plurality of information owner PCs. Then, the information provision adequacy determining unit 13 of the information owner PC may receive the reply from the information manager and judge the provision adequacy according to the reply.

Note that as described above, the information providing support devices 1, 1A, and 1B according to this invention can be implemented by installing application programs (hereinafter, referred to as "supporting applications") for realizing the functions of the information providing support devices 1, 1A, and 1B onto the personal computers or the like. Here, the supporting application is not only provided as a software package to the user of the personal computer, but such a service mode is also possible that, for example, when the user of the personal computer performs user registration with a predetermined community site, the supporting application is provided in a downloadable format from a server device managed by a webmaster thereof under approval of the user.

Further, in the above-mentioned exemplary embodiments, there is provided a configuration of an information providing support device comprising: an information storage unit for memorizing at least information input by a user of the information providing support device; an information providing request receiving unit for receiving an information providing request without intermediation of a user operation; an internal information retrieval unit for retrieving relevant information from the information storage unit in response to the information providing request received by the information providing request receiving unit, the relevant information being information relevant to the information providing request; and an information providing request presenting unit for presenting a predetermined information manager with the information providing request for which the relevant information has been retrieved by the internal information retrieval unit and the relevant information in association with each other, the information manager being authorized to permit provision of the information stored in the information storage unit. In the above-mentioned exemplary embodiments, the information storage unit is realized by the internal information database 2. Further, the information providing request receiving unit is realized by the information providing request receiving unit 10. Further, the internal information retrieval unit is realized by the internal information retrieval unit 11. Further, the information providing request presenting unit is realized by one of the information providing request presenting units 12, 12A, and 12B.

Further, in the above-mentioned exemplary embodiments, there is provided a configuration in which the information providing request presenting unit presents the relevant information retrieved in response to the information providing request, as a provision candidate (including a reply candidate) in association with the information providing request (specifically, see FIGS. 5 to 8).

Further, in the above-mentioned exemplary embodiments, there is provided a configuration of an information providing support device including an information provision adequacy determining unit for determining whether or not the relevant information can be provided in a case where the retrieved relevant information is set as the provision candidate, in which: the information providing request presenting unit presents information for making an inquiry as to provision adequacy of the provision candidate when the information providing request and the provision candidate are presented in association with each other; and the information provision adequacy determining unit determines the provision adequacy of the relevant information presented as the provision candidate according to a reply from the information manager to the inquiry. In the above-mentioned exemplary embodiments, the information provision adequacy determining unit and the information providing request presenting unit are realized by the information provision adequacy determining unit 13 and the information providing request presenting unit 12A according to the second exemplary embodiment (specifically, see the operation of Steps S21 and S22 in FIG. 10).

Further, in the above-mentioned exemplary embodiments, there is provided a configuration of an information providing support device including a preliminary information provision adequacy determining unit for determining the provision adequacy of the relevant information set as the provision candidate based on a security risk level of the relevant information, a conformity with the information providing request, or a combination thereof before the information providing request presenting unit presents the information manager with the information providing request and the provision candidate in association with each other, and for screening the provision candidate about which the information providing request presenting unit is caused to make an inquiry based on a result of the determination, in which the information providing request presenting unit makes the inquiry to the information manager about the provision adequacy only of the provision candidate screened by the preliminary information provision adequacy determining unit. In the above-mentioned exemplary embodiments, the preliminary information provision adequacy determining unit and the information providing request presenting unit are realized by the preliminary information provision adequacy determining unit 14 and the information providing request presenting unit 12B according to the third exemplary embodiment (specifically, see the operation of "No" in Step S32 and of Step S21 of FIG. 14).

Further, in the above-mentioned exemplary embodiments, there is provided a configuration of an information providing support device in which the preliminary information provision adequacy determining unit determines the provision adequacy of the relevant information based on the security risk level calculated by detecting how much information corresponding to personal information or confidential matters is included in the relevant information by using a dictionary in which the information corresponding to the personal information or the confidential matters are pre-memorized. Further, there is provided a configuration of an information providing support device in which the preliminary information provision adequacy determining unit determines the provision adequacy of the relevant information based on the security risk level preset in an area in which the relevant information preliminarily set as the provision candidate is stored. Further, there is provided a configuration of an information providing support device in which the preliminary information provision adequacy determining unit calculates the conformity of the relevant information with the information providing request based on a similarity between search request contents indicated by the information providing request and the relevant information set as the provision candidate which has been retrieved in response to the information providing request. Further, there is provided a configuration of an information providing support device in which: the internal information retrieval unit retrieves information similar to question contents indicated by the information providing request from the information storage unit, and then extracts information to serve as an answer to the information similar to the question contents as the relevant information set as the provision candidate; and the preliminary information provision adequacy determining unit calculates the conformity of the relevant information with the information providing request based on a similarity between the question contents indicated by the information providing request and the information similar to the question contents retrieved in response to the information providing request. In the above-mentioned exemplary embodiments, the preliminary information provision adequacy determining unit and the internal information retrieval unit are realized by the preliminary information provision adequacy determining unit 14 and the internal information retrieval unit 11 according to the third exemplary embodiment (specifically, see the description of the previous determination of the provision adequacy).

Further, in the above-mentioned exemplary embodiments, there is provided a configuration of an information providing support device in which the preliminary information provision adequacy determining unit screens, as an inquiry subject, the provision candidate having the provision adequacy undetermined as a result of the determination. Further, in the above-mentioned exemplary embodiments, there is provided a configuration of an information providing support device in which the preliminary information provision adequacy determining unit screens, as an inquiry subject, the provision candidate having the provision adequacy undetermined and the provision candidate determined to be providable as a result of the determination. Further, in the above-mentioned exemplary embodiments, there is provided a configuration of an information providing support device in which the preliminary information provision adequacy determining unit screens, as an inquiry subject, the provision candidate having the provision adequacy undetermined and the provision candidate determined to be unprovidable as a result of the determination. Further, in the above-mentioned exemplary embodiments, there is provided a configuration of an information providing support device in which the preliminary information provision adequacy determining unit screens, as an inquiry subject, the provision candidate determined to be providable as a result of the determination. In the above-mentioned exemplary embodiments, the preliminary information provision adequacy determining unit is realized by the preliminary information provision adequacy determining unit 14 according to the third exemplary embodiment (specifically, see the description of the decision of the necessity of the inquiry with respect to the determination result).

Further, in the above-mentioned exemplary embodiments, there is provided a configuration of an information providing support device in which the information providing request presenting unit includes a relevant information editing unit for displaying an editing screen for causing contents of the relevant information to be edited, and for editing the relevant information according to the user operation performed on the editing screen. In the above-mentioned exemplary embodiments, the relevant information editing unit is realized by the information providing request presenting unit 12A according to the second exemplary embodiment (specifically, the provision candidate creation function included by the information providing request presenting unit 12A).

Further, in the above-mentioned exemplary embodiments, there is provided a configuration of an information providing support method of supporting provision of information according to an information providing request, including: receiving the information providing request without intermediation of a user operation; retrieving information relevant to the received information providing request from an information storage unit provided to a device that has received the information providing request, the information storage unit memorizing at least information input by a user of the device; and presenting a predetermined information manager with the information providing request for which the relevant information has been retrieved from the information storage unit and the relevant information in association with each other, the information manager being authorized to permit the provision of the information stored in the information storage unit.

In the above-mentioned information providing support method, the relevant information retrieved in response to the information providing request may be presented as a provision candidate in association with the information providing request. Further, in the information providing support method, information for making an inquiry as to provision adequacy of the provision candidate may be presented when the information providing request and the provision candidate are presented in association with each other, and the provision adequacy of the relevant information presented as the provision candidate may be determined according to a reply from the information manager to the inquiry.

Further, in the above-mentioned exemplary embodiments, there is provided a configuration of a computer-readable recording medium recorded with an information provision supporting program for supporting provision of information according to an information providing request, the information provision supporting program causing a computer to execute: a reception processing of receiving the information providing request without intermediation of a user operation; a retrieval processing of retrieving information relevant to the received information providing request from an information storage unit provided to the computer for memorizing at least information input by a user of the computer; and a presentation processing of presenting a predetermined information manager with the information providing request for which the relevant information has been retrieved from the information storage unit and the relevant information in association with each other, the information manager being authorized to permit the provision of the information stored in the information storage unit.

In a computer-readable recording medium recorded with the above-mentioned information provision supporting program, the information provision supporting program may cause the computer to present, in the presentation processing, the relevant information retrieved in response to the information providing request, as a provision candidate in association with the information providing request. Further, in a computer-readable recording medium recorded with the above-mentioned information provision supporting program, the information provision supporting program may cause the computer to: present, in the presentation processing, information for making an inquiry as to provision adequacy of the provision candidate when the information providing request and the provision candidate are presented in association with each other; and execute, after the presentation processing, a determination processing of determining the provision adequacy of the relevant information presented as the provision candidate according to a reply from the information manager to the inquiry.

While the invention has been particularly shown and described with reference to exemplary embodiments (examples) thereof, the invention is not limited to these exemplary embodiments (examples). It will be understood by those of ordinary skill in the art that various changes in form and details may be made therein without departing from the sprint and scope of the present invention as defined by the claims.

INDUSTRIAL APPLICABILITY

In an organization such as a corporation, this invention can be applied to the computer used by the user having an intention or an obligation to provide information to quite a few extent, such as the user of the knowledge management system for sharing and utilizing knowledge or the user of the question/response site on the Internet/intranet, and can improve the achievements by activating the information distribution and invigorating intellectual activities of the organization/community.

This application is based upon and claims the benefit of priority from Japanese patent application No. 2007-202095, filed on Aug. 2, 2007, the disclosure of which is incorporated herein in its entirety by reference.

The invention claimed is:

1. An information providing support device for supporting provision of information according to an information providing request, the information providing support device comprising
    an information storage unit for memorizing at least information input by a user of the information providing support device;
    an information providing request receiving unit for receiving the information providing request without intermediation of a user operation;
    an internal information retrieval unit for retrieving relevant information from the information storage unit in response to the information providing request received by the information providing request receiving unit, the relevant information being information relevant to the information providing request;

an information providing request presenting unit for presenting a predetermined information manager with the information providing request for which the relevant information has been retrieved by the internal information retrieval unit and the relevant information in association with each other, the information manager being authorized to permit the provision of the information stored in the information storage unit, wherein the information providing request presenting unit presents the relevant information retrieved in response to the information providing request, as a provision candidate in association with the information providing request and also presents information for making an inquiry as to provision adequacy of the provision candidate; and an information provision adequacy determining unit for determining whether or not the relevant information can be provided in a case where the retrieved relevant information is set as the provision candidate, wherein:

the information provision adequacy determining unit determines the provision adequacy of the relevant information presented as the provision candidate according to a reply from the information manager to the inquiry.

2. An information providing support device according to claim 1, further comprising a preliminary information provision adequacy determining unit for determining the provision adequacy of the relevant information set as the provision candidate based on a security risk level of the relevant information, a conformity with the information providing request, or a combination thereof before the information providing request presenting unit presents the information manager with the information providing request and the provision candidate in association with each other, and for screening the provision candidate about which the information providing request presenting unit is caused to make an inquiry based on a result of the determination, wherein the information providing request presenting unit makes the inquiry to the information manager about the provision adequacy only of the provision candidate screened by the preliminary information provision adequacy determining unit.

3. An information providing support device according to claim 2, wherein the preliminary information provision adequacy determining unit determines the provision adequacy of the relevant information based on the security risk level calculated by detecting how much information corresponding to personal information or confidential matters is included in the relevant information by using a dictionary in which the information corresponding to the personal information or the confidential matters are pre-memorized.

4. An information providing support device according to claim 2, wherein the preliminary information provision adequacy determining unit determines the provision adequacy of the relevant information based on the security risk level preset in an area in which the relevant information preliminarily set as the provision candidate is stored.

5. An information providing support device according to claim 2, wherein the preliminary information provision adequacy determining unit calculates the conformity of the relevant information with the information providing request based on a similarity between search request contents indicated by the information providing request and the relevant information set as the provision candidate which has been retrieved in response to the information providing request.

6. An information providing support device according to claim 2, wherein:

the internal information retrieval unit retrieves information similar to question contents indicated by the information providing request from the information storage unit, and then extracts, as the relevant information set as the provision candidate, information to serve as an answer to the information similar to the question contents; and the preliminary information provision adequacy determining unit calculates the conformity of the relevant information with the information providing request based on a similarity between the question contents indicated by the information providing request and the information similar to the question contents retrieved in response to the information providing request.

7. An information providing support device according to claim 2, wherein the preliminary information provision adequacy determining unit screens, as an inquiry subject, the provision candidate having the provision adequacy undetermined as a result of the determination.

8. An information providing support device according to claim 2, wherein the preliminary information provision adequacy determining unit screens, as an inquiry subject, the provision candidate having the provision adequacy undetermined and the provision candidate determined to be providable as a result of the determination.

9. An information providing support device according to claim 2, wherein the preliminary information provision adequacy determining unit screens, as an inquiry subject, the provision candidate having the provision adequacy undetermined and the provision candidate determined to be unprovidable as a result of the determination.

10. An information providing support device according to claim 2, wherein the preliminary information provision adequacy determining unit screens, as an inquiry subject, the provision candidate determined to be providable as a result of the determination.

11. An information providing support method of supporting provision of information according to an information providing request, the method comprising:

receiving the information providing request without intermediation of a user operation;

retrieving information relevant to the received information providing request from an information storage unit provided to a device that has received the information providing request, the information storage unit memorizing at least information input by a user of the device;

presenting a predetermined information manager with the information providing request for which the relevant information has been retrieved from the information storage unit and the relevant information in association with each other, the information manager being authorized to permit the provision of the information stored in the information storage unit;

presenting the relevant information retrieved in response to the information providing request, as a provision candidate in association with the information providing request and also presenting information for making an inquiry as to provision adequacy of the provision candidate; and determining the provision adequacy of the relevant information presented as the provision candidate according to a reply from the information manager to the inquiry.

12. A non-transitory computer-readable recording medium recorded with an information provision supporting program for supporting provision of information according to an information providing request, the information provision supporting program causing a computer to execute:
- a reception processing of receiving the information providing request without intermediation of a user operation;
- a retrieval processing of retrieving information relevant to the received information providing request from an information storage unit provided to the computer for memorizing at least information input by a user of the computer;
- a presentation processing of presenting a predetermined information manager with the information providing request for which the relevant information has been retrieved from the information storage unit and the relevant information in association with each other, the information manager being authorized to permit the provision of the information stored in the information storage unit, wherein the information provision supporting program further causing the computer to present, in the presentation processing, the relevant information retrieved in response to the information providing request, as a provision candidate in association with the information providing request and also to present information for making an inquiry as to provision adequacy of the provision candidate; and execute, after the presentation processing, a determination processing of determining the provision adequacy of the relevant information presented as the provision candidate according to a reply from the information manager to the inquiry.

* * * * *